United States Patent
Johnston et al.

(10) Patent No.: US 12,265,648 B2
(45) Date of Patent: *Apr. 1, 2025

(54) SYSTEM AND METHOD OF AUTOMATED DETERMINATION OF USE OF SENSITIVE INFORMATION AND CORRECTIVE ACTION FOR IMPROPER USE

(71) Applicant: Verint Americas Inc., Alpharetta, GA (US)

(72) Inventors: Michael Johnston, Alpharetta, GA (US); Neil Eades, Glasgow (GB); Ashish Sood, Glasgow (GB)

(73) Assignee: Verint Americas, Inc, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,559

(22) Filed: Apr. 2, 2024

(65) Prior Publication Data
US 2024/0249023 A1    Jul. 25, 2024

Related U.S. Application Data

(63) Continuation of application No. 17/507,471, filed on Oct. 21, 2021, now Pat. No. 11,972,017.
(Continued)

(51) Int. Cl.
*G06F 21/74*   (2013.01)
*G06F 21/62*   (2013.01)
(Continued)

(52) U.S. Cl.
CPC .......... *G06F 21/6245* (2013.01); *G06F 21/72* (2013.01); *G06F 40/279* (2020.01); *G06V 20/40* (2022.01); *G10L 25/51* (2013.01)

(58) Field of Classification Search
CPC .. G06F 40/279; G06F 21/6245; G06F 21/629; G06F 21/70; G06F 21/71;
(Continued)

(56) References Cited

U.S. PATENT DOCUMENTS 6,671,818 B1 * 12/2003 Mikurak ................. H04L 63/08
714/48
8,464,352 B2    6/2013 Toomey
(Continued)

FOREIGN PATENT DOCUMENTS

AU       2014281026 A1      1/2016
CA        2975105 C  *     9/2021 ........... G06F 21/606
(Continued)

OTHER PUBLICATIONS

Microsoft Corporation, Apr. 21, 2016, "Monitoring and protecting sensitive data in Office 365", available at: https://www.microsoft.com/en-usitshowcase/monitoring-and-protecting-sensitive-data-in-office-365#relatedcontent (Retreived Jan. 19, 2022).
(Continued)

*Primary Examiner* — Khanh Q Dinh
(74) *Attorney, Agent, or Firm* — Christopher M. Scherer; Erin Ella Block; DeWitt LLP

(57) ABSTRACT

The present invention allows a CEC system to automatedly track the use, storage, access, and modification of sensitive information/data in the system through desktop monitoring. Further, through desktop, video, and audio monitoring of CSRs the system can automatedly determine the improper use, access, storage, and modification of sensitive information by implementing sensitive data use rules that allow a system to be specialized for the user. Finally, the system can automatedly determine and implement violation actions for the improper use, storage, access, and manipulation of sensitive information. This provides an intelligent system
(Continued)

Figure 2A:
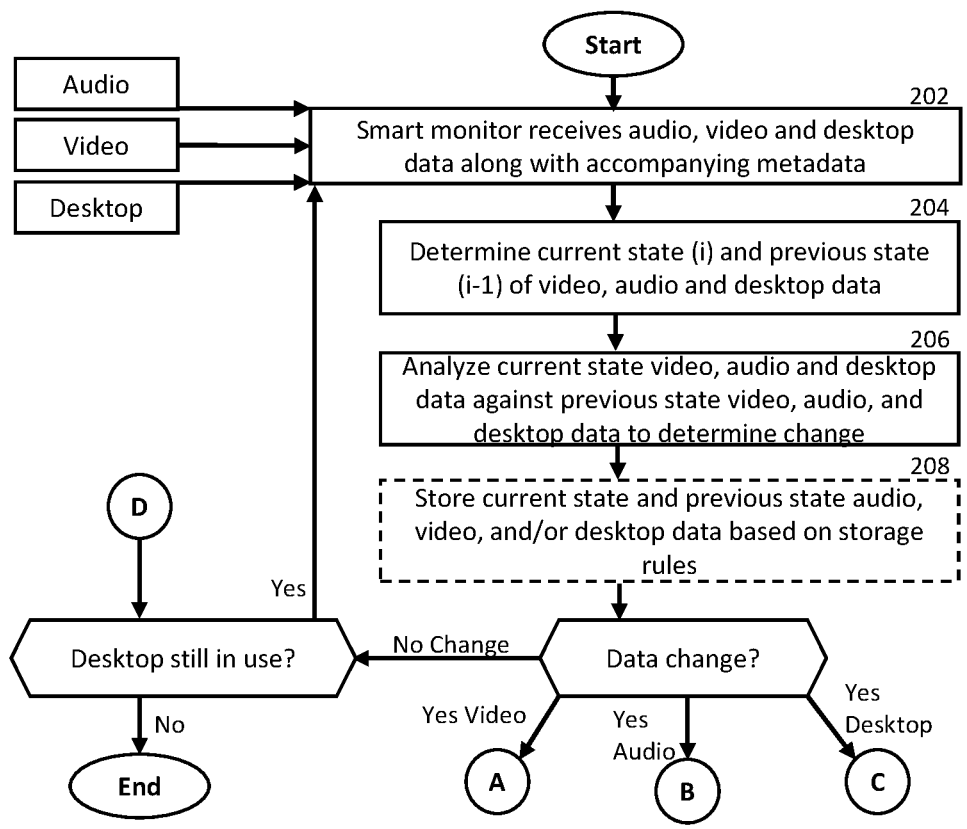
Figure 2B:
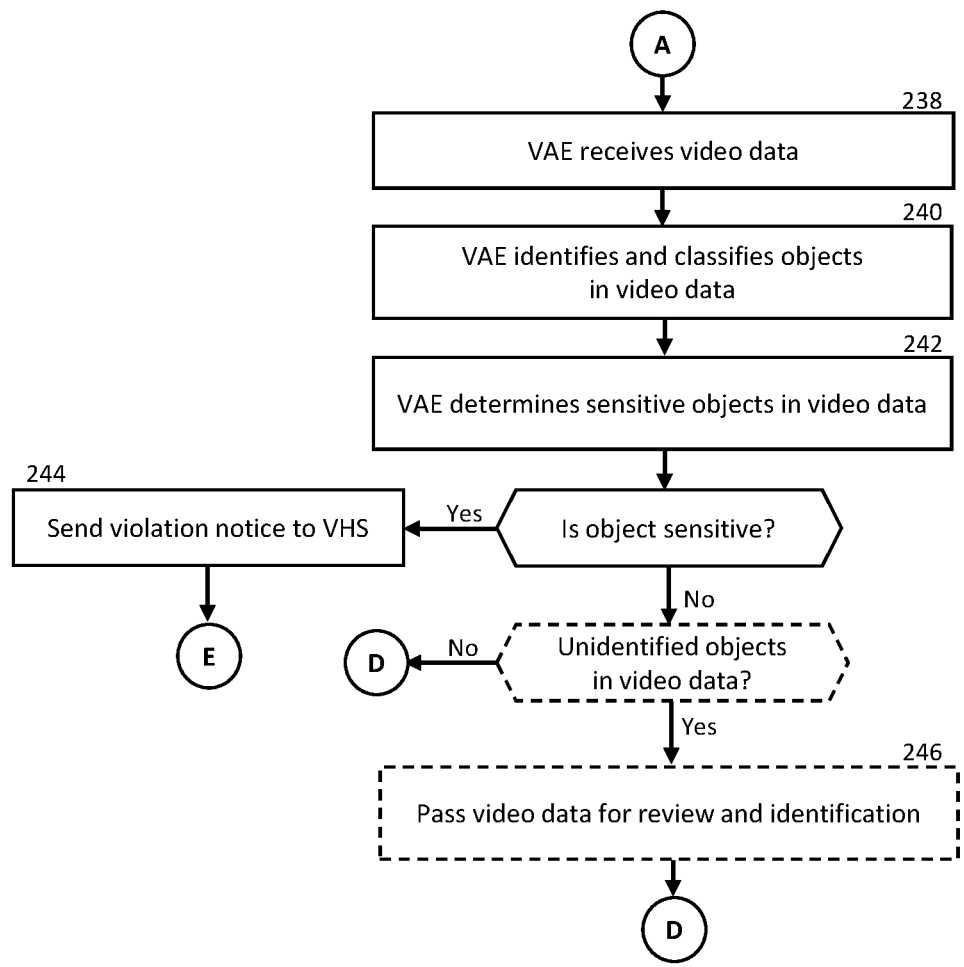
Figure 2C:
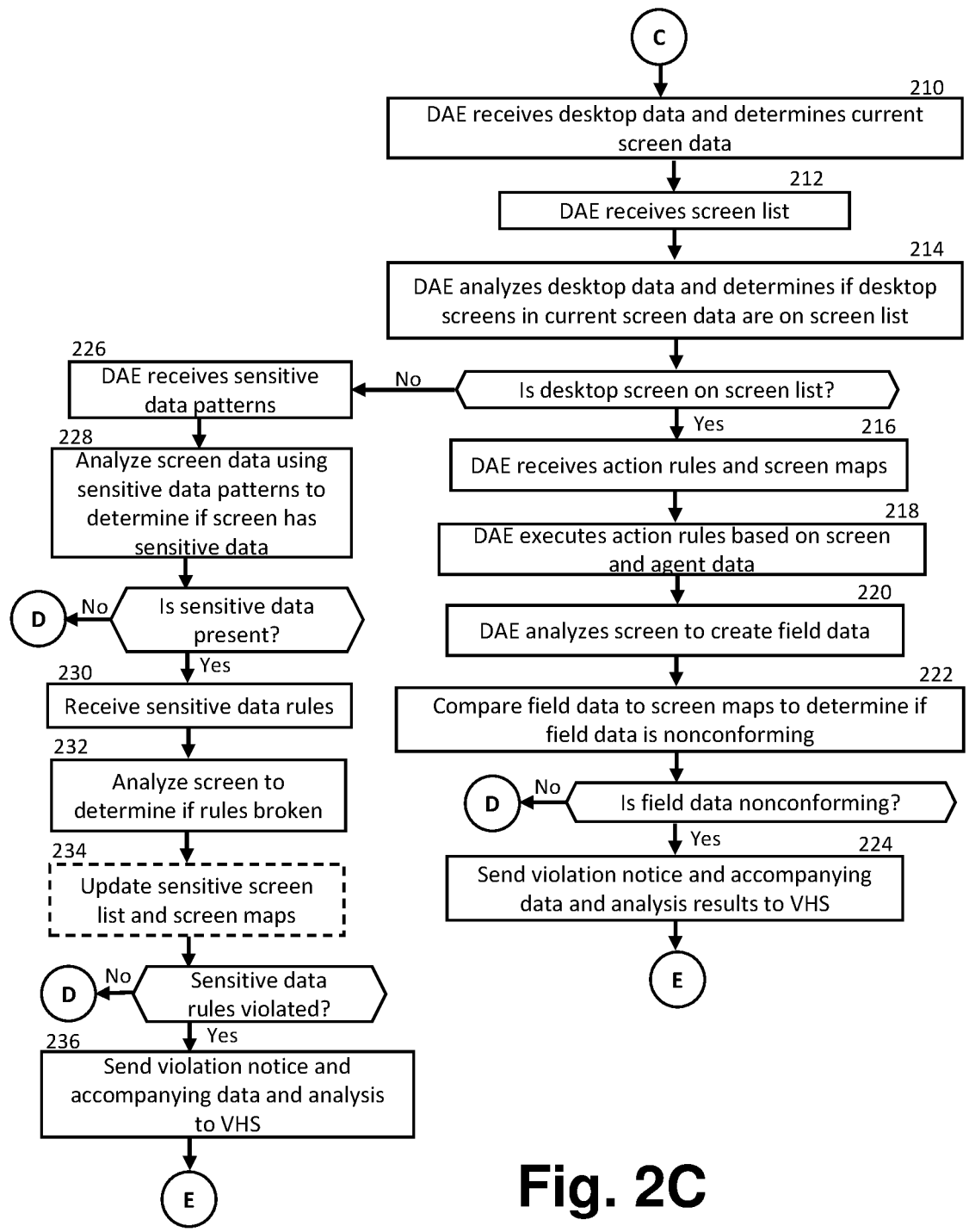
Figure 2D:
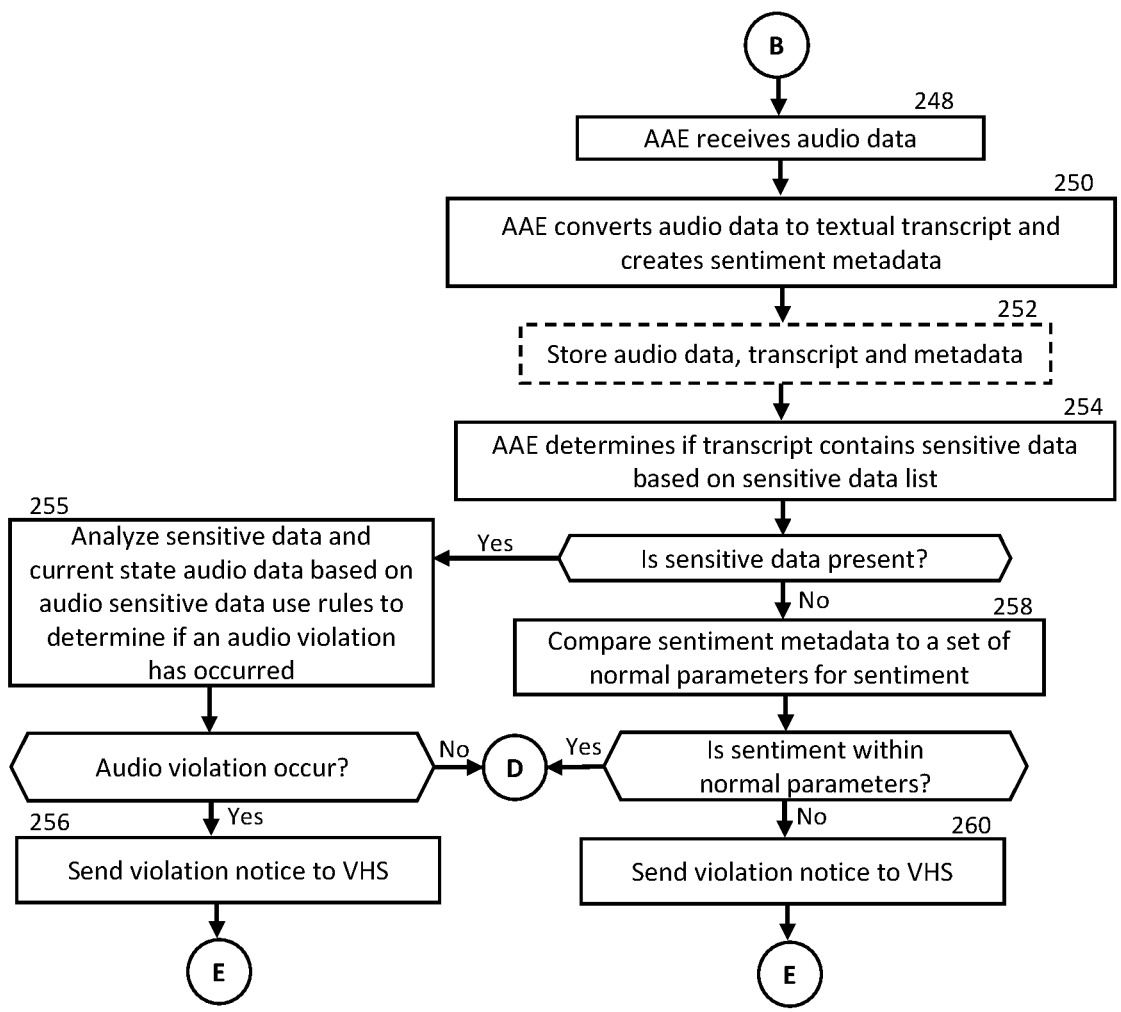
Figure 2E:
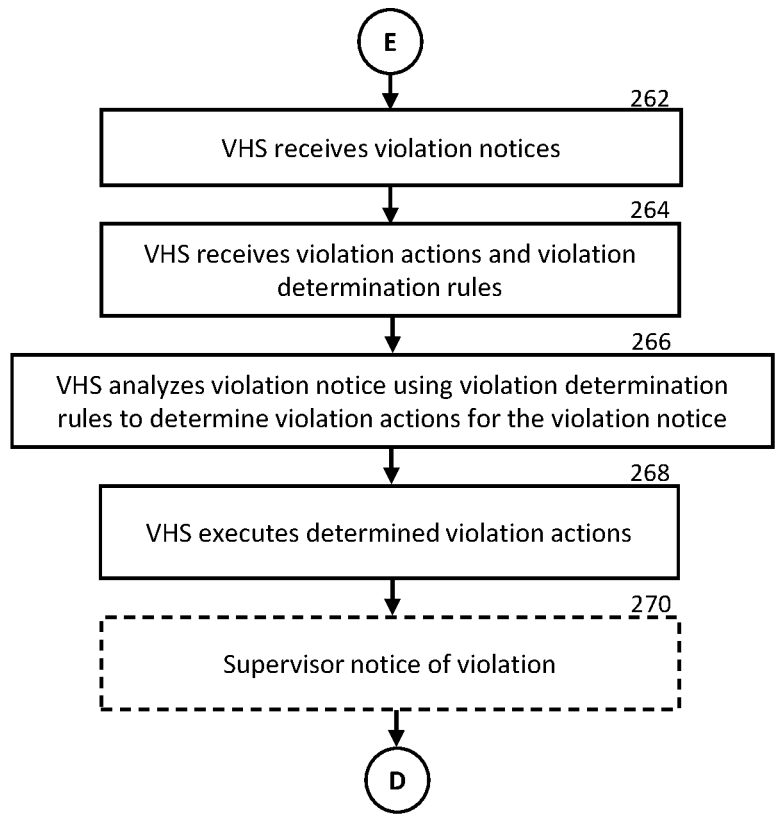

capable of locating all sensitive data in the system and regulating the use, access, and storage of sensitive data in the system.

20 Claims, 7 Drawing Sheets

Related U.S. Application Data

(60) Provisional application No. 63/094,607, filed on Oct. 21, 2020.

(51) Int. Cl.
*G06F 21/72* (2013.01)
*G06F 40/279* (2020.01)
*G06V 20/40* (2022.01)
*G10L 25/51* (2013.01)

(58) Field of Classification Search
CPC ......... G06F 21/72; G06F 21/74; G06V 20/40; G10L 25/51
USPC ................................ 709/203, 220, 224–228
See application file for complete search history.

(56) References Cited

U.S. PATENT DOCUMENTS

| | | | |
|---|---|---|---|
| 10,339,299 B1 | 7/2019 | Magnuson et al. | |
| 10,355,947 B2 | 7/2019 | Tida et al. | |
| 10,402,589 B1 | 9/2019 | Madisetti et al. | |
| 10,503,927 B1 | 12/2019 | Madisetti et al. | |
| 10,515,212 B1 | 12/2019 | Mcclintock et al. | |
| 10,891,375 B1* | 1/2021 | Stolfo | G06F 16/248 |
| 11,120,144 B1* | 9/2021 | Kassam-Adams | H04L 9/0643 |
| 11,176,443 B1* | 11/2021 | Selva | G06F 18/25 |
| 11,330,053 B1 | 5/2022 | Van Den Dungen et al. | |
| 11,379,612 B2 | 7/2022 | Madisetti et al. | |
| 11,632,258 B1* | 4/2023 | Libin | G06F 3/165 |
| | | | 709/204 |
| 11,775,814 B1* | 10/2023 | Anand | G06F 16/53 |
| | | | 706/25 |
| 11,972,017 B2* | 4/2024 | Johnston | G06F 21/554 |
| 2005/0138110 A1* | 6/2005 | Redlich | G06F 21/6254 |
| | | | 709/201 |
| 2007/0013527 A1* | 1/2007 | Sloan | G06Q 30/02 |
| | | | 340/573.4 |
| 2008/0215722 A1* | 9/2008 | Hogaboom | H04L 67/535 |
| | | | 709/224 |
| 2010/0162312 A1 | 6/2010 | Heilbron et al. | |
| 2013/0276054 A1* | 10/2013 | Martini | G06F 21/552 |
| | | | 726/1 |
| 2013/0339457 A1* | 12/2013 | Freire | G06Q 10/0635 |
| | | | 709/204 |
| 2014/0188921 A1* | 7/2014 | Thomason | G06F 40/289 |
| | | | 707/758 |
| 2018/0027006 A1 | 1/2018 | Zimmermann et al. | |
| 2018/0129876 A1 | 5/2018 | Odinak et al. | |
| 2019/0180291 A1 | 6/2019 | Schmeling et al. | |
| 2020/0202039 A1 | 6/2020 | Madisetti et al. | |
| 2020/0287870 A1 | 9/2020 | Discenza | |
| 2020/0410092 A1* | 12/2020 | Mishra | G06F 21/552 |
| 2022/0116736 A1* | 4/2022 | Williams | G16H 50/20 |
| 2022/0121776 A1* | 4/2022 | Johnston | G06F 21/554 |
| 2023/0179955 A1* | 6/2023 | Williams | A61B 5/4833 |
| | | | 455/456.1 |

FOREIGN PATENT DOCUMENTS

| | | | | |
|---|---|---|---|---|
| CA | 2898048 C | * | 5/2022 | ............ B60K 35/00 |
| IN | 2014MU01875 A | | 12/2015 | |
| JP | 4289753 B2 | | 7/2009 | |
| WO | 2019007371 A1 | | 1/2019 | |

OTHER PUBLICATIONS

Teramind Inc., 2022, "Types of Employee Monitoring Software", available at: https://www.teramind.co/solutions/employee-monitoring-software#app-usage (retreived Jan. 19, 2022).

IS Decisions, 2022, "File Audit", available at: https://www.isdecisions.com/products/fileaudit/file-and-folder-monitoring.htm, (retreived Jan. 19, 2022).

International Preliminary Report on Patentability issued from the International Bureau of WIPO on May 4, 2023, in connection with related pplication PCT/US2021/056058.

International Search Report and Written Opinion issued from the International Bureau of WIPO on Jan. 27, 2022, in connection with related application PCT/US2021/056058.

\* cited by examiner

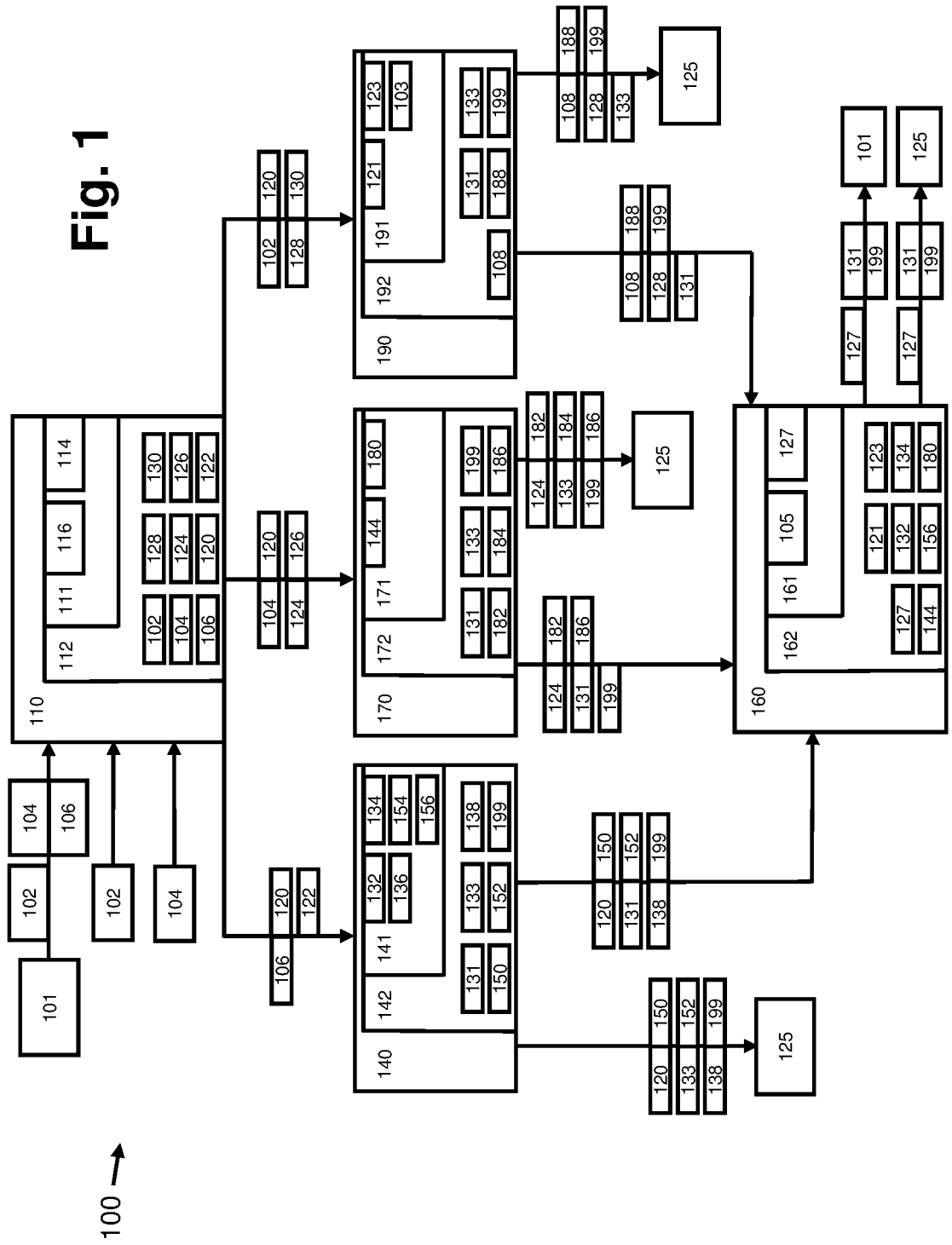

SYSTEM AND METHOD OF AUTOMATED DETERMINATION OF USE OF SENSITIVE INFORMATION AND CORRECTIVE ACTION FOR IMPROPER USE

CROSS-REFERENCE TO RELATED APPLICATIONS

The present application is a continuation of U.S. application Ser. No. 17/507,471 filed Oct. 21, 2021, which claims priority of U.S. Provisional Application No. 63/094,607, filed Oct. 21, 2020, the contents of which are incorporated herein by reference in their entirety.

FIELD

The present disclosure is directed to systems and methods of automated computer analysis, corrective application of the analysis, and machine learning. Specifically, automated systems and methods for determining the use of sensitive data, automatedly providing correction of the improper use of sensitive data through training the system to determine improper use of sensitive data and appropriate corrective actions through artificial intelligence lead pattern recognition.

BACKGROUND

In almost any situation where a customer/consumer provides sensitive personal information to a clerk/agent either in person or through the use of technology (over a customer engagement center (CEC) system, there is a concern that the clerk, agent, or customer service representative (collectively CSRs) could be purposefully or inadvertently using that sensitive personal information improperly or incorrectly. Further, international laws and industry standards such as HIPPA, PCI, UK Data Protection Act, European GDPR define restrictions on the use of personal data, restrictions on transferring it between countries, define rights of users to see what data is held, and even defines the right to be forgotten. Accordingly, it is important for companies and businesses to control and restrict where sensitive personal information is input into a system, who can put sensitive data into the system, where that sensitive data can be input into the system, how that sensitive personal information is accessed and used, and who has access to the information.

Typically, traditional ways of dealing with sensitive personal information include training CSRs on the proper handling and use of personal sensitive information including where and how this information can be stored in the computerized system. Some computerized systems can control which CSRs or employees have access to different data in the computerized system, which can be used to control which employees have access to the sensitive personal information. However, even systems that implement some form of controlled access to sensitive personal information still rely on employees inputting sensitive personal information into the system correctly and using the sensitive personal information appropriately.

SUMMARY

An ideal system would be able to automatedly monitor the use, input, access, and storage of sensitive personal information. Further, the system would be able to control the use, input, access, and storage of sensitive personal information and automatedly determine restrictions/actions to be taken by the system for detected attempts at improper use, access, input, and storage of personal sensitive information. The present invention overcomes the deficiencies in prior systems. The present invention is directed to a system and methods of monitoring and controlling the use, input, access, and storage of sensitive personal information in a computerized system for a customer engagement center (CEC) through desktop monitoring, audio monitoring, and video monitoring of customer service representatives (CSR).

The already existing systems do not prevent the input of sensitive personal information in inappropriate places of the system, which could enable employees who are restricted from accessing sensitive personal information to now be able to access the sensitive personal information or enable agents to inappropriately use or store the information. Further, these systems are not able to monitor the input, use, and accessing of sensitive personal information to determine if the input, use, and access is inappropriate. Finally, these systems are not capable of automated determination of when and where sensitive personal information is stored in the system and maintain identification on where the sensitive personal information is stored and associations. The system and methods described herein improve the use of computers and monitoring technology in a number of ways. At minimum, the desktop monitoring improves monitoring technology by providing an ability to monitor all windows events and intercept windows text including text in the windows clipboard. Using image recognition techniques for video monitoring text in videos can be detected and analyzed. Speech to text engines may be used to intercept and interpret audio data in video and phone calls. Using the text analytics the system can recognize potentially sensitive information contained in the desktop events, video events, and audio events to flag them as sensitive information through artificial intelligence and machine learning lead pattern recognition. The system can take punitive actions based on the inappropriate use of sensitive data including, but not limited to updating the windows clipboard to present copying and pasting of information, pausing recordings of video and/or phone calls, locking violators out of the system, an application, etc., and alerting supervisors of violations, By monitoring agent activity through desktop monitoring, video monitoring and audio monitoring, it is possible to understand where sensitive personal information exists and is input into the system, where it is transferred to for audit, where it is stored, who accesses it, and whether there is an attempt to input, access, store, or use sensitive personal information inappropriately. This enables the system to automatedly take preventative measures to reduce fraud and violations of laws and standards regarding use, storage, and access of sensitive personal information. Through the desktop monitoring the system can monitor all windows events and intercept windows text even in the windows clipboard.

The system can use desktop monitoring to determine information input (keyboard activity or voice inputs), output (display and transfer of data between systems), manipulation. The system can monitor screens that are open on agents' computers and store data pertaining to the screens that are and were open on agents' computers. The system can apply pattern matching to detect personal or sensitive customer information that is being attempted to input and/or store in the system or is being attempted to access from the system. When personal or sensitive information is encountered the computerized system can automatedly trigger actions to process the sensitive data usage and determine if it is an approved usage or if the usage is inappropriate. If the usage is determined by the system to be inappropriate, the system can also take steps to correct and/or prohibit the inappropriate use.

Additionally, the system can also track where sensitive data is stored and corelate the location of the stored data with metadata so it can be easily located for future needs. This is traditionally accomplished in the industry by manually telling the system through training and configuration what screens and databases sensitive information is stored. Essentially a system would traditionally need to be explicitly told what screens/fields contain sensitive data and the system would need to be told to keep track of where that sensitive data is kept. Because the system and methods described herein are trained using machine learning/AI pattern recognition to automatedly identify sensitive data even on screens/fields where sensitive data is not expected, the systems and methods of the application do not need to be configured to know where sensitive data will be input, it trains itself to know where sensitive data is input. The system is able to then track where the identified sensitive data is stored and locate sensitive data easily if needed.

As an agent uses applications/programs running/operating on the system, desktop monitoring can be used to track and intercept actions such as copying information out of the application or typing details that appear elsewhere on screen into another application (such as an email or notepad application). Through analysis and pattern matching the system can detect when the copied or typed information is personal or sensitive customer information, and automatedly trigger the sensitive data processing actions. The sensitive data processing actions can determine the propriety of the action and whether corrective action is needed.

The system can also use video monitoring (alone or in combination with desktop monitoring and/or audio monitoring) to identify the use, input, accessing, and presence of personal and sensitive data where desktop monitoring alone may not be sufficient. For example, using video analysis of the user/agent (e.g. from their webcam in their desktop or another camera with a view of the user) the system can detect, through video monitoring, when an agent may be manually copying information from the system, such as writing notes on a notepad or using their personal mobile phone. When this occurs, the system can analyze if the actions in the video scene denote the presence/use of sensitive data and whether its presence and use is appropriate. Further, in conjunction with the desktop monitoring the system can analyze the actions in the scene and match the action in the video to the screens currently open on the agent's computer, or very recently open and available to the agent. The system can then detect if personal or sensitive data is present or was very recently on screen. If the system correlates video behavior with the inappropriate use/presence of sensitive information, the system can trigger the sensitive data processing actions, determine if corrective action needs to be taken, and implement the corrective action (if needed).

The system can also use audio monitoring through voice analytics to identify the use, input, accessing, and presence of personal and sensitive data where desktop monitoring alone may not be sufficient. For example, through audio monitoring the system can capture what the agent says to others in the room, over the phone, or any other audio communication, using voice analysis a transcript of the audio can be made. It can be determined from the transcript if the agent or other parties are discussing or verbally providing information pertaining to sensitive data and if the presence of the sensitive data is appropriate/approved. Using the desktop monitoring described above in conjunction with the audio monitoring, the transcript can be corelated with the activity on the desktop. The system can then detect if personal or sensitive data is present or was very recently on screen. If the system correlates inappropriate audio behavior with the use/presence of sensitive information, the system can trigger the sensitive data processing actions, determine if corrective action needs to be taken, and implement the corrective action (if needed).

Through continuous monitoring and analysis of agent desktop usage, video monitoring and audio monitoring, the system can determine and track the agent's use, input, accessing, and presence of sensitive information. The system can determine who the agent is interacting with (which customer/client), identify where sensitive information is being input into the system, build a map of all applications/programs and all screens of applications/programs that might include the input and/or storage of personal and/or sensitive information. Further, the system can analyze the sensitive information and determine if the use is a violation of company policy (improper use), further analyze suspected/potential violations, and take actions to prohibit the improper use of sensitive information. For example, the system could notify the agent if a violation occurs, informing them that this information should not appear here; block, restrict or prevent entering of the information on a screen or in an application that shouldn't hold such information (for example prevent information that can be used for fraud such as credit card information or security question answers from being put in an email); and/or record the screen interactions and send to a supervisor to review when a violation occurs, or is suspected.

An embodiment of the present application includes a method for desktop monitoring to automatedly control the presence and use of sensitive data through identifying the presence/use of sensitive data through desktop monitoring and automatedly performing violation handling if the presence/use of sensitive data is inappropriate/unapproved. Another embodiment of the present application is a system for performing the method of desktop monitoring to automatedly control the presence and use of sensitive data through identifying the presence/use of sensitive data through desktop monitoring and automatedly performing violation handling if the presence/use of sensitive data is inappropriate/unapproved. The system includes at least one CEC desktop, a processor and a non-transitory computer readable medium programmed with computer readable code that upon execution by the processor causes the processor to execute the above-mentioned method. Another embodiment of the present application is a non-transitory computer readable medium programmed with computer readable code that upon execution by a processor causes the processor to execute the above-mentioned method for desktop monitoring to automatedly control the presence and use of sensitive data through identifying the presence/use of sensitive data through desktop monitoring and automatedly performing violation handling if the presence/use of sensitive data is inappropriate/unapproved.

Another embodiment of the present application includes a method for video data monitoring to control the presence/use of sensitive data through identifying the presence/use of sensitive data in the video data and automatedly performing violation handling if the presence/use of sensitive data is inappropriate/unapproved. Another embodiment of the present application is a system for performing the method of video data monitoring to control the presence/use of sensitive data through identifying the presence/use of sensitive data in the video data and automatically performing violation handling if the presence/use of sensitive data is inappropriate/unapproved. The system includes at least one video capture device, a processor and a non-transitory computer readable medium programmed with computer readable code that upon execution by the processor causes the processor to execute the above-mentioned method. Another embodiment of the present application is a non-transitory computer readable medium programmed with computer readable code that upon execution by a processor causes the processor to execute the above-mentioned method for video data monitoring to control the presence/use of sensitive data through identifying the presence/use of sensitive data in the video data and automatedly performing violation handling if the presence/use of sensitive data is inappropriate/unapproved.

Another embodiment of the present application includes a method for audio data monitoring to control the presence/use of sensitive data through identifying the presence/use of sensitive data in the audio data and automatedly performing violation handling if the presence/use of sensitive data is inappropriate/unapproved. Another embodiment of the present application is a system for performing the method of audio data monitoring to control the presence/use of sensitive data through identifying the presence/use of sensitive data in the audio data and automatedly performing violation handling if the presence/use of sensitive data is inappropriate/unapproved. The system includes at least one audio capture device, a processor and a non-transitory computer readable medium programmed with computer readable code that upon execution by the processor causes the processor to execute the above-mentioned method. Another embodiment of the present application is a non-transitory computer readable medium programmed with computer readable code that upon execution by a processor causes the processor to execute the above-mentioned method audio data monitoring to control the presence/use of sensitive data through identifying the presence/use of sensitive data in the audio data and automatedly performing violation handling if the presence/use of sensitive data is inappropriate/unapproved.

Another embodiment of the present application includes a method for processing audio, video and desktop data to identify sensitive data, identify inappropriate use of sensitive data, and automatedly apply violation handling for inappropriate use of sensitive data. The method includes providing a customer engagement center (CMS) with a smart monitoring system (SMS), a video analytics engine (VAE), a desktop analytics engine (DAE), an audio analytics engine (AAE), and a violation handling system (VHS). The SMS receiving audio data, video data, and desktop data from at least one audio recorder, video recorder, and customer service representative (CSR) desktop in real-time. The SMS analyzing the audio data, video data, and desktop data to create a current state for each audio data, video data, and desktop data and identify a change state for each audio data, video data, and desktop data based on a previous state for each audio data, video data, and desktop data. The SMS transferring the current state and change state video data to the VAE. The VAE analyzing the current state video data to identify and classify objects in the current state video data. The VAE analyzing each object in the video data classified as a sensitive object to determine improper sensitive objects in the current state video data based on current state and previous state video data. For each improper sensitive object, the VAE generating a video violation notice. The VAE transferring the video violation notice to the VHS. The SMS transferring the current state and change state audio data to the AAE. The AAE analyzing the current state audio data to convert the current state audio data to a textual transcript and generate audio metadata. The AAE analyzing the textual transcript and audio metadata to identify sensitive data and an intent of current state audio data using audio analytics. The AAE analyzing each identified sensitive data in the current state audio data to determine improper sensitive audio data in the current sate audio data. The AAE analyzing the intent of the current state audio data to determine if the intent is within a set of normal parameters. For each improper sensitive audio data, the AAE generating an audio violation notice. For each intent outside the set of normal parameters, the AAE generating an audio violation notice. The AAE transferring each audio violation notice to the VHS. The SMS transferring the current state and change state desktop data to the DAE. The DAE performing screen scraping of the current state desktop data to determine a set of current screen data for the current state desktop data. The DAE comparing the set of current screen data to a screen list to determine if any of the set of current screen data matches any screens on the screen list. Based on the comparison, the DAE determining that at least one screen in the set of current screen data matches a screen on the screen list. Based on the comparison, the DAE determining that at least one screen in the set of current screen data does not match any screen on the screen list. For each screen in the set of current screen data that match a screen on the screen list (match screens), the DAE performing the following: implementing a set of action rules for each match screen in real time, using screen scraping on each match screen to generate a set of field data, and applying a field map model to the set of field data to identify nonconforming filed data. The DAE identifying at least one nonconforming field data in the match screens and generating a desktop nonconforming violation notice for each nonconforming filed data. The DAE transferring each desktop nonconforming violation notice to the VHS. For all screens in the set of current screen data that do not match a screen on the screen list (nonmatch screens), the DAE performing the following: applying a set of sensitive data patterns to the nonmatch screen screen data to determine if sensitive data is present in the nonmatch screen screen data, identifying at least one sensitive data in the nonmatch screen screen data, analyzing the at least one sensitive data in the nonmatch screen screen data based on sensitive data use rules to identify improper sensitive data use, and analyzing the sensitive screen list and the screen maps based on the sensitive data in the nonmatch screen screen data and automatedly updating the sensitive screen list and the screen maps based on the analysis. The DAE identifying at least one improper sensitive data use in the nonmatch screens and generating a desktop use violation notice for each improper sensitive data use. The DAE transferring each desktop use violation notice to the VHS. Receiving by the VHS all audio violation notices, video violation notices, desktop nonconforming violation notices, and desktop use violation notices in real time. For each audio violation notice, video violation notice, desktop nonconforming violation notice, and desktop use violation notice (violation notices), the VAE analyzing the violation notice against a set of violation determination rules to apply at least one violation action. The VAE applying the at least one violation action to implement a proscribed action to at least one of the video recorder, audio recorder, or desktop associated with the violation notice. The VAE analyzing the violation determination rules, the violation actions, and the violation notices to automatedly update the violation determination rules and the violation actions.

Another embodiment of the present application includes a method for processing audio, video and desktop data to identify sensitive data, identify inappropriate use of sensitive data, and automatedly apply violation handling for inappropriate use of sensitive data. The method includes providing a customer engagement center (CMS) with a smart monitoring system (SMS), a video analytics engine (VAE), a desktop analytics engine (DAE), an audio analytics engine (AAE), and a violation handling system (VHS). Analyzing, by the SMS, audio data, video data, and desktop data in real time to generate current state data and previous state data for each audio data, each video data, and each desktop data. Analyzing the current state video data by the VAE to identify improper sensitive objects in the current state video data and generate video violation notices for each identified improper sensitive object in the current state video data. Analyzing, by the AAE, the current state audio data to identify improper sensitive audio data in the current state audio data and generate video violation notices for each identified improper sensitive audio data in the current state audio data. Analyzing, by the DAE, the current state desktop data to identify active screens, wherein at least one active screen is a screen known to contain sensitive data and at least one active screen is a screen unknown to contain sensitive data, for each identified screen identify improper sensitive desktop data in the current state desktop data and generate desktop violation notices for each identified improper sensitive desktop data in the current state desktop data. Analyzing, by the VHS, audio violation notices, video violation notices, and desktop violation notices in real time to apply at least one violation action to each audio violation notice, video violation notice, and desktop violation notice.

Another embodiment of the present application is an automated computer system for automatedly for processing audio, video and desktop data to identify sensitive data, identify inappropriate use of sensitive data, and automatedly apply violation handling for inappropriate use of sensitive data. The system includes a customer engagement center (CEC) that includes at least one video recording device, at least one audio recording device, at least one customer service representative (CSR) desktop device, at least one system processor, the system processor includes a smart monitoring system (SMS), a video analytics engine (VAE), a desktop analytics engine (DAE), an audio analytics engine (AAE), and a violation handling system (VHS); and a non-transitory computer readable medium programmed with computer readable code that upon execution by the processor causes the processor to execute the above-mentioned methods.

Another embodiment of the present application is a non-transitory computer readable medium programmed with computer readable code that upon execution by a processor causes the processor to execute the above-mentioned methods for automatedly for processing audio, video and desktop data to identify sensitive data, identify inappropriate use of sensitive data, and automatedly apply violation handling for inappropriate use of sensitive data.

The objects and advantages will appear more fully from the following detailed description made in conjunction with the accompanying drawings.

BRIEF DESCRIPTION OF THE DRAWING(S)

FIG. 1 depicts an exemplary embodiment of a CEC system for automatedly tracking the use, access, storage, and modification of sensitive information, automatedly determining if the use, access, storage, input, and modification of sensitive information is proper/improper, and automatedly determining and executing violation actions for improper use, access, storage, input, and modification of sensitive information through desktop monitoring, video monitoring, and/or audio monitoring.

FIGS. 2A, 2B, 2C, 2D and 2E depict a flowchart of an exemplary embodiment of a method of automatedly tracking the use, access, storage, and modification of sensitive information, automatedly determining if the use, access, storage, input, and modification of sensitive information is proper/improper, and automatedly determining and executing violation actions for improper use, access, storage, input, and modification of sensitive information through desktop monitoring, video monitoring and/or audio monitoring.

Figure 3:
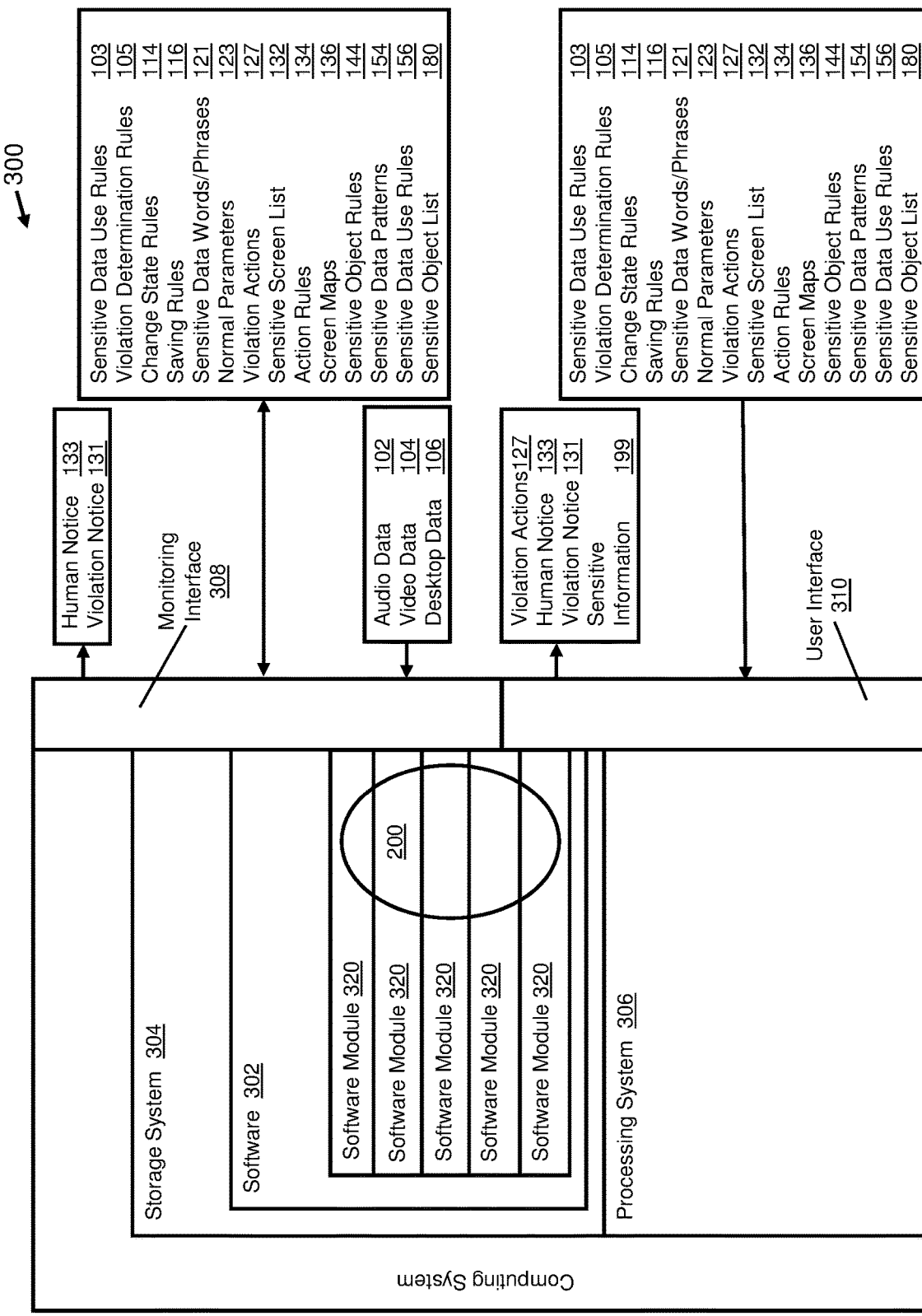

FIG. 3 depicts an exemplary embodiment of a system for automatedly tracking the use, access, storage, and modification of sensitive information, automatedly determining if the use, access, storage, input, and modification of sensitive information is proper/improper, and automatedly determining and executing violation actions for improper use, access, storage, input, and modification of sensitive information through desktop monitoring, video monitoring and/or audio monitoring.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By providing organized and integrated computer-based customer service resources and applications, an agent is able to efficiently and accurately assist customers. However, these resources and applications contain sensitive data and information about the customer. Further, to effectively assist customers, CSRs may need appropriate access to this sensitive data and need to be able to enter and/or correct sensitive customer data. For example, a customer may contact a CSR requesting to purchase a product. The CSR will need to obtain the customer's payment information to process the order. This payment information is sensitive data being input into the system, that may later be stored in the system and associated with the customer, and may be transferred by the system to other systems or later accessed in the system. A further example is where a customer has chosen to have credit card information saved in the system for future use such that the customer does not need to provide the credit card information for each purchase, the system can simply access the sensitive data (credit card information) on file. To facilitate this behavior, the system must store copy of this sensitive information in the system. In both of these situations, the sensitive data could be entered, accessed and/or used improperly.

Whereas, the systems and methods described herein prevent the inappropriate use, access, and input of sensitive data through desktop monitoring, video monitoring, and audio monitoring of all data the system learns, using machine learning and AI pattern recognition, when sensitive data is input, used, or accessed, and whether that use, access, and input is acceptable. If the use, input, or access is not acceptable the systems and methods are able to automatedly implement violation procedures, including, but not limited to, blocking copying and pasting of sensitive information, pausing recordings of video and audio, and supervisor notification of violations. Further, because the systems and methods described herein automatedly learn to identify sensitive information that is input, used, and accessed, the system is able to enforce regulatory compliance pertaining to where information is allowed to be stored and how it can be accessed.

Accordingly, a system that monitors (through desktop monitoring, video monitoring, and/or audio monitoring) agents' use, access, and input of sensitive data and the presence of sensitive data can allow an organization to achieve several key benefits. The first benefit is increased protection to customers' sensitive data to protect against fraud and accidental misuse of sensitive data. The system will identify the use, access, input, and presence of sensitive data. The system can then be trained to determine if the use, access, input, and/or presence of sensitive data is improper. Further, the system can learn what corrective actions to take when it determines improper use of sensitive data. Additional benefit is the ability to easily access and identify sensitive data relating to each customer. By tracking where sensitive data is maintained in the system and correlating it to customer information, the system can maintain a network of sensitive data information. This can be used to update, check, and/or remove sensitive information relating to one customer, several customers, or all customers. These benefits will lead to increased customer satisfaction and increased customer security.

In order for the system to determine the use, access, input, presence and storage of sensitive data, the system continually monitors and analyzes CSRs' computer usage. Further the system continually uses video monitoring and audio monitoring in conjunction with the desktop monitoring to enhance the determinations of sensitive data usage, where desktop monitoring/analysis may not be sufficient.

FIG. 1 depicts an exemplary embodiment of CEC system 100 for automatedly tracking the use, access, storage, and modification of sensitive information, automatedly determining if the use, access, storage, input, and modification of sensitive information is proper/improper, and automatedly determining and executing violation actions for improper use, access, storage, input, and modification of sensitive information.

CEC system 100 includes at least one CEC agent device/desktop 101 which can be used by a CSR or other agent/employee for interacting with customers (over a phone system, through email/chat/social media, in person, etc.). The CEC agent desktop 101 is connected to the CEC system which may include, in addition to the portions of the system described herein, a telephone system, text transmission systems, chat server system, messaging server system, a video system, an audio system, such that the CSR can interact with clients/customers using the CEC agent desktop 101 either through audio, over the telephone system for example, through text response, over email for example, or in person. The CEC system continually monitors the CEC agents/CSRs, customers, and CEC agent desktops 101 through desktop monitoring, video monitoring, and audio monitoring. The CEC system continually gathers desktop data 106, video data 104, and audio data 102 from the monitoring and processes it to include associated metadata. The associated metadata may include, but is not limited to, a time stamp of the date, time, and/or duration of the captured data, an agent identification associated with the data, a customer identification associated with the data, a site location for the agent, the location of the data source, the location of the client (if available), the channel/media type associated with the data (e.g., social messaging platform, email, phone, voice, text, video, co-browse, an application, etc.), an interaction type associated with the data, etc., video and audio recordings from times when the agent is not on an active call, video and audio records from video and audio recorders other than the video/audio recorder being used by the agent's current call. The system tracks user actions in applications, which can also be provided as associated metadata. In an embodiment, the metadata may include multiple agent identifications where more than one agent is assisting a customer/client or where more than one agent may be visible in the video data or audible in the audio data which may be either in an active roll or in the background. It should be understood that some of the metadata included may be applicable to each the audio data, the video data, and the desktop data or may be only applicable to one or more of the types of monitored data. The CEC system sends the audio data (with associated metadata) 102, the video data (with associated metadata) 104, and the desktop data (with associated metadata) 106 to a Smart Monitoring System (SMS) 110 to determine if any of the desktop, video, or audio data has changed. The audio data 102 (with associated metadata) and video data 104 (with associated metadata) may be captured by devices separate from the CEC agent device/desktop 101 and sent to the SMS 110 as well.

CEC system 100 includes a SMS unit 110 having a SMS software module 111 and an optional SMS storage 112. SMS unit 110 may be a processor or a combination of a processing system and a storage system. SMS unit 110 receives the audio data (with associated metadata) 102, the video data (with associated metadata) 104, and the desktop data (with associated metadata) 106 for each video device, audio device, and each CEC agent desktop 101 from the CEC system. While the audio data 102, video data 104, and desktop data 106 is continually received by the SMS from all monitored devices (audio devices, video devices, and desktop devices) it may be received in groupings or pairings to allow the SMS to better process and correlate the received data. For example, in an embodiment, the video, audio, and desktop data may be received by the SMS system based on an agent by agent manner such that the SMS will receive the currently monitored video data, audio data, and/or desktop data for each agent/CSR where the video data and the audio data would include data from all audio and video devices where the metadata indicates the agent is part of the audio and/or video data (which may be just as a background actor). The SMS unit 110 analyzes the received video/audio/desktop data 102, 104, and 106 to create current state audio data 128, prior state audio data 130, current state video data 124, prior state video data 126, current state desktop data 120, and prior state desktop data 122. Using the SMS software module 111, the SMS compares the current state (120, 124, 128) and prior state (122, 126, 130) for each type of received data to determine if there has been a change between the current state and prior state based on a set of change state rules 114. If the current state desktop data 120 is changed, the SMS will pass the current state desktop data 120 to a Desktop Analysis Engine (DAE) 140. If the current state video data 124 is changed, the SMS will pass the current state video data 124 to a Video Analysis Engine (VAE) 170. If the current state audio data 128 is changed, the SMS will pass the current state audio data 128 to an Audio Analysis Engine (AAE) 190. Optionally, SMS unit 110 may also pass a copy of the audio data 102, video data 104, desktop data 106, current state desktop data 120, prior state desktop data 122, current state video data 124, prior state video data 126, current state audio data 128, and/or prior state audio data 130 to internal or external SMS storage 112 or other storage for permanent or temporary storage. In embodiments, the SMS may also pass the prior state data (122, 126, 130) to the respective analysis engines with the current state data. In an embodiment, the SMS may pass additional data with the current state data and prior state data to the respective analysis engines to aid in analysis, such as corresponding video data and audio data associated with the desktop data, or corresponding desktop and audio data associated with the video data, or corresponding desktop and video data with the audio data. This may be based on similar metadata such as the same timestamps and/or the same agent identification and/or the same customer identification, for example.

In embodiments the storage is a searchable database that stores all video/audio/desktop data for later use and analysis. In an embodiment, the SMS may determine whether the data (video/audio/desktop, current state/prior state) is stored based on predetermined saving rules 116.

Desktop data 106 may include all data, information, and details present on the display of the agent CEC desktop 101 whether actively present and/or visibly displayed or inactively present and not visibly displayed, including recordings of the user's screen, events describing user actions in the application such as mouse clocks, selections, keyboard actions, copy/paste actions, and a list of open applications. Desktop data 106 may include but is not limited to, a list of all applications/programs running on the agent CEC desktop 101, a screen shot of each application/program running on the agent CEC desktop 101, metadata relating to each application/program running on the agent desktop/terminal, ghost data (which includes keystrokes, text, images, etc. that have been entered into the agent's computer/terminal but not necessarily stored/saved into the system), and keystroke tracking data, along with the associated metadata. The desktop data 106 may be in numerous forms including emails received/sent, transcripts of text chats, transcripts of messaging conversations from social and messaging platforms, transcripts of video and call recordings, uploaded attachments and data, SMS messages, types words/data input by the agent, stored information pertaining to the customer and/or agent such as personal information stored in custom management, human resources systems and other databases including external programs/systems the agent may be viewing and data from external systems that an application has transferred into the CEC system. Video data 104 may include, but is not limited to, incoming and outgoing video data from the CEC agent desktop 101 camera or other cameras where the agent is in view (which may include being in the background of the view), and associated metadata, including incoming video stream from video call software, outgoing video stream from video call software, screen shar video from video call software, recordings from the contact center from other cameras where the agent is in view. The video data 104 may include a screen shot from the current state of the desktop video camera and a screen shot of the current state of any other cameras where the agent is in view. Video data 104 can be run through video analysis to generate a stream of text and images coupled with metadata. Video data 104 may include, but is not limited to, video calls, video call recordings, video from video connection applications such as Microsoft Teams, Zoom, Webex, etc., backgrounds in video, screen share video. The audio data 102 may include, but is not limited to, a recording and/or real-time stream of any conversations by the agent over the telephone system or captured through a microphone in the agent's computer/terminal or any other microphone enabled to capture conversations by the agent and associated metadata. Audio data 102 may include real-time audio calls via telephone, VoIP and any other audio source, recorded audio calls, audio from audio devices in meeting rooms and/or other audio sources, background conversations captured from both the contact center side and the customer side. Audio data 102 may be run through real-time speech analytics to generate a text stream coupled with audio metadata (which may include an indication of emotion, sentiment and intent), this process can be performed by the CEC system or by a real-time speech analytics system combined with the CEC system or separate from the CEC system.

The current state data (desktop 120, video 124, and audio 128) and previous state data (desktop 122, video 126, and audio 130) can be determined by the SMS in a number of ways and the way of determination can be different for each type of data. In one embodiment, the current state data (desktop 120, video 124, and audio 128) and previous state data (desktop 122, video 126, and audio 130) may be based on time elapsed between the data, such that a new state is based on a predetermined amount of time (e.g., every second, nanosecond, minute, etc.). In another embodiment, the current state video data 124 and prior state video data 126 may be based on frame rate of the video data, whereas the current state audio data 128 and prior state audio data 130 may be determined based on the rate the audio data 102 is received. In some embodiments, the current data state and the prior data state may be determined based on the transfer rate to the SMS. In further embodiments, the current state data and previous state data may be when there is a change in the data state. In this embodiment every new current state data would be considered to be a changed state from the previous state data. In this embodiment, a comparison between the current state data and previous state data would not be required to determine if there is a change in the data. However, it may still be necessary to compare the previous state data and the current state data for other purposes. It should be understood that the above are merely examples of how the SMS may determine current and prior state data for video/audio/desktop and that the above examples can be used independently or in combination. These examples should not be construed as limiting. The current state data (desktop 120, video 124, and audio 128) and previous state data (desktop 122, video 126, and audio 130) also includes the corresponding metadata from the associated metadata included with the audio data 102, video data 104, and desktop data 106 for the respective state.

While the video data, audio data, and desktop data is continuous, the SMS, using the change state rules 114 determines if there has been a change in the data from the previous state to warrant a review of the data to determine if sensitive data is present, for example, but not limited to, new application is opened on the desktop, text is manipulated on the desktop, actions are taken by the user on the desktop, a new call is started, a new person joins or leaves a call, a new object is detected in the video stream, new background noises are detected, or new words are detected. The change state rules 114 determine what constitutes a change in data from one state to another. The change state rules 114 enable to SMS to analyze the current state data and the previous state data and determine if there has been a change to the data from the previous state. The change state rules 114 may be predetermined by the company/organization and customized for each organization, there may be a general set of agreed upon rules among a group of organizations. Further, the change state rules 114 could be manually updated/changed or automatedly updated/changed based on training the SMS to create/modify change state rules 114 based on analysis of current state and previous state data either in real time or as historic data. For example, when the SMS identifies a new screen that contains sensitive information, the system may automatedly update the change state rules 114 to indicate that any time the identified screen is navigated to, the state has changed or that anytime text is manipulated on the identified screen the state has changed, whereas prior to the system identifying sensitive data on the new screen it was not considered a change state event. This is merely an example of a potential automated update to change state rules 114 and should not be considered limiting.

It should be understood that change state rules 114 may be the same or different for each type of data being analyzed. Examples of change state rules 114 may include, but are not limited to, regarding desktop data, when a new application screen is displayed/run, when a screen transition has occurred, when screens are changed or updated, new application is opened, or text is manipulated (e.g., copied, typed, accessed). For example, if the agent opened a new application in the current state 120 that was not open in the previous state 122, a change has occurred in at least the desktop data 106 or if the agent has entered text/keystrokes into an application in the current state 120 that was not in the previous state 122, a change has occurred in at least the desktop data 106. If text data has been modified, deleted, copied or pasted in the current state 120, this may be another example that the current state 120 has changed from the previous state 122 for desktop data 106. For example, regarding audio monitoring, If the agent or customer is talking in the current state audio data 128, it may be considered that the current state audio data 128 has changed from the previous state audio data 130, regardless of whether the agent or customer was talking in the previous state 130. If the agent or customer is no longer talking (there is no audio data for the current state) in the current state audio data 128 but was talking in the previous state audio data 130, the current state audio data 128 may be determined to have changed from the previous state audio data 130. If there was no audio data 102 for both the current state audio data 128 and the previous state audio data 130, the change state rules 114 may indicate there was no change in the audio data 102. If the background noise in the audio data has changed, it may be considered that the state has changed. With regard to video data 104, if the agent has moved positions, has picked up the phone, there is a new customer in the video, if the background has changed, these may all be examples of where the change state rules 114 would indicate the video data 104 has changed. It should be understood that the above are merely examples change state rules 114 and these examples should not be considered limiting. In an embodiment, the change state rules 114 include any rule that would enable to SMS to determine that any data (other than time stamp) has been changed or modified from the previous state to the current state.

Because the SMS continuously monitors the video 104, audio 102, and desktop data 106 for audio device, each video device, and each CEC agent desktop 101, the storage of the data can occur based on any number of factors. In one embodiment, the SMS stores all audio 102, video 104, and desktop 106 data as it is sent to the SMS. In embodiments, all video, audio, and desktop data is stored. In embodiments, the storage can be based on specified time intervals, such as storing the current state of the video 124, audio 128, and desktop data 120 every second, every minute, every nanosecond, etc. In embodiments, the storage could also occur based on different events such as there being a change in the data or when a specific application on the CEC agent desktop 101 is accessed or when an audio trigger occurs, etc. Further, it should be understood that the saving of video, audio, and desktop data can occur simultaneously such that if video data 104 is being saved, the corresponding audio 102 and desktop data 106 is being saved as well. In another embodiment, the saving of video data 104, audio data 102, and desktop data 106 could be independent of each other. Additionally, the saving could be a combination of simultaneous saving and independent saving based on saving rules 116 determined for when saving should occur. The saving rules 116 can be predetermined rules such that when certain conditions are met the current state and/or previous state of video data, audio data, and/or desktop data should be saved. For example, one such rule might be that the current state of video 124, audio 128, and desktop data 120 is saved very second. Another example rule may be that if there is any change in the current state of the audio data 128, the video data 124, and/or the desktop data 120, the changed data will be saved. Both of these example rules could be included in the predetermined saving rules 116 and implemented at the same time. It should be understood that the above are merely examples of saving rules 116 and/or hard coded system determinations for determining when audio data 102, video data 104, desktop data 106, the current state of the video data 124, audio data 128, and/or desktop data 120, and/or the prior state of the desktop data 122, video data 126, and audio data 130 is saved and should not be considered limiting.

CEC system 100 also includes a DAE 140 having a DAE software module 141 and optional DAE storage 142. DAE 140 may be a processor or a combination of a processing system and a storage system. DAE 140 receives current state desktop data 120 from the SMS and analyzes it to determine if the current state desktop data 120 contains sensitive data 199 (input, accessed, manipulated, deleted, copied, displayed, etc.) and determines if the sensitive data 199 is appropriate or involves a violation regarding the use of sensitive data 199. In embodiments the DAE may receive all current state desktop data 120. In embodiments, the DAE only receives current state desktop data 120 that has been determined by the SMS and the change state rules to be a changed state from the prior state desktop data 122. Additionally, the DAE 140 tracks the presence of sensitive data 199 in current state desktop data 120 and correlates it with user information, data type, client identification, and storage location such that certain types of sensitive data can be easily identified and found in the system by category and/or by client. Categories of interest may be finding all sensitive data 199 that is a particular type of sensitive data 199 or finding all sensitive data stored for a particular customer, for example. The DAE 140 may receive current state desktop data 120 when the SMS 110 has determined that the current state desktop data 120 has changed from the previous state desktop data 122. In an embodiment, the DAE 140 may receive all current state desktop data 120 from the SMS 110. Optionally, when the DAE receives current state desktop data 120, the DAE may also receive the monitored desktop data 102 and/or the previous state desktop data 124.

The desktop data received by the DAE 140 may include, but is not limited to, current state desktop data and metadata 120 and, in embodiments, previous state desktop data and metadata 122 for each application/program running on the system. In embodiments, the DAE 140 may also receive audio data and video data related to the current state desktop data to aid in determining the presence of sensitive data 199 and the use of sensitive data 199. Current state desktop data 120 and previous state desktop data 122 may include all data from the monitored desktop data 106 as discussed above, including, but not limited to, data that would be available from a screen shot of the application/program, data that has been input into an application, data that has been copied from the application, data that has been deleted from the application, data that has been cut from the screen, and data that has been pasted into the application. The desktop data 106 (current or previous) is also associated with metadata as discussed above which includes but is not limited to the application/program in which the data is contained, a screen name and a list of fields for data in each screen for the application/program, a timestamp for the desktop data, the agent associated with the use/access of the desktop use, the customer associated with the desktop data.

Sensitive data 199 is any data that an organization, company, entity, government, and/or individual has determined to be sensitive. Sensitive data 199 may include, but is not limited to, customer credit card numbers and data, social security numbers, customer addresses, customer health information, etc. What constitutes sensitive data 199 can be predetermined by the company/organization and can be updated/modified by the company/organization. Further, the system may dynamically update what is considered sensitive data 199 based on updates to sensitive data patterns 154. The system identifies all sensitive data 199 in the current desktop data 120 and stores the sensitive data 199 with user information, interaction type, and other related information such that the sensitive data 199 can be easily identified at a later time for access, review, and potential removal. In an embodiment, sensitive data 199 is any information that would be considered personal information under the European Union General Data Protection Regulation and any information that would be considered personal information under the California Consumer Privacy Rights Act or any other privacy regulations/laws, which would include, but is not limited to any information relating to an identified or identifiable person such that the individual is identified or identifiable either directly or indirectly from one or more identifiers in the information specific to that individual. For example, name, identification number (account number, credit card number, social security number, any other unique identification number specific to the person), location data, an online identifier, one or more facts specific to the physical, physiological, genetic, mental, economic, cultural or social identity of the person. It should be understood that these are merely examples of sensitive data and should not be considered limiting.

Identifying the presence of sensitive data 199 in current state desktop data 120 may be accomplished in a variety of ways. Further, determining if the sensitive data 199 is being accessed, input, used, stored, modified properly or improperly can be accomplished in a variety of ways. In an embodiment, to perform the analysis of the current state desktop data 120 and make the above determinations, the DAE 140 accesses a number of predetermined and/or dynamically determined analytical rules including a sensitive screen list 132, action rules 134, screen maps 136, sensitive data use rules 156, and sensitive data patterns 154. In an embodiment, the DAE 140 may determine current screen data 150 for each application/program/window in use (in active memory) in the current state desktop data 106 to allow the DAE to make a screen-by-screen determination regarding the presence of sensitive data 199. In an embodiment, the DAE 140 may only determine current screen data 150 for each application/program/window whose current state desktop data 120 is changed from the previous state desktop data 122. This may be determined by the SMS 110 and communicated to the DAE 140 or the SMS 110 may optionally pass the previous state desktop data 122 to the DAE 140 and the DAE 140 may make the determination. In another embodiment, current screen data 150 is determined for each application/program/window in the current state desktop data 120, regardless of change from the previous state desktop data 122.

Current screen data 150 includes all of the current state desktop data 120 for each screen in the current state desktop data along with metadata for each screen, which may include, but is not limited to all open applications (in active memory), components within each open application including metadata describing their type and current data and state, the screen name for the screen active in each open application, and an indication for each application relating to the active status of the application (e.g., focused element, visible, background, minimized, etc.). In an embodiment, the current screen data 150 for each screen only includes the received current state desktop data 120 classified for each screen in the current state desktop data 120. In an embodiment, the current screen data 150 for each screen includes the current state desktop data 120 for that screen and additional metadata pertaining to the current screen data 150 such as, but not limited to, an indication if the current screen data 150 has changed, been modified, or differs from the current screen data in the previous state desktop data 122. The current state desktop data 120 may include screen identifications for each screen in the current state desktop data 120. In embodiments, screen names are determined by the DAE analysis of the current state desktop data 120. The system can use screen scraping and desktop analytics to determine data relating to the applications/programs being used in the current state desktop data 120 to determine current screen data 150. Screen scraping can determine time spent on each application/window, text on screen and actions the user is performing.

There are many ways that the DAE 140 can analyze the current state desktop data 120 to determine if sensitive data 199 is present. One way to determine if sensitive data is present in the current desktop data 120 is to maintain a sensitive screen list 132 which is a list of screens in programs/applications that are known to likely include sensitive data 199. For example, a screen that provides client information that includes sensitive data or a screen that requests an input of sensitive data. In embodiments, the DAE 140 analyzes the current state desktop data 120 to determine current screen data 150 for each application/program running/operating in the current state data 120. The DAE can then compare the current screen data 150 for each screen to the sensitive screen list 132 to determine if any of the current screens are on the sensitive screen list 132.

The sensitive screen list 132 can be predetermined and/or automatedly determined and/or automatedly updated by the system. Typically, the initial sensitive screen list 132 will be a predetermined list of screen names for applications/programs that are known and/or expected to contain sensitive data 199 or allow for the input of known sensitive data 199. The system is capable of automatedly determining that additional screens (e.g., non-predetermined screens) contain sensitive information and automatedly determine whether the screen name should be added to the sensitive screen list 132. In some embodiments this may be a recommendation to a user, such as a business owner or IT professional to add the screen name to the sensitive screen list. However, in other embodiments, the system may automatedly add the screen name to the sensitive screen list 132 based on the determination by the system that the screen should be added. For example, as described below, in an embodiment, even if the screen is not on the sensitive screen list 132, the DAE determines if the screen contains sensitive data 199. The DAE may have a set of rules that indicates a screen will be added to the sensitive screen list 132 if the DAE determines that an instance of the screen contains sensitive data (either input or accessed) and meets additional criteria (for example, the same screen has been found to contain sensitive data 199 on a set number of prior occasions or the sensitive data contained in the screen is a particular type of sensitive data). It should be understood that these are merely examples of rules for automated determination of inclusion of a screen in the sensitive screen list 132 and should not be considered limiting.

In an embodiment employing a sensitive screen list, the analysis of the current screen data 150 can be accomplished in any number of ways to determine if the current desktop data 120 from the applications/programs running on the desktop are from screens listed on the sensitive screen list 132. One way of determining if the current screen data 150 for an application/program is on the sensitive screen list 132 is to compare the name of the screen for the current screen data 150 to the name of the screens on the received sensitive screen list 132. If the name of the screen for the current screen data 150 matches the name on the received sensitive screen list 132, then that screen for the current screen data 150 is a sensitive screen and is known to contain sensitive data 199. However, this method is dependent on all screens for programs/applications being uniquely identifiable with no overlapping names. In another embodiment where the system uses screen scraping and desktop analytics to determine data relating to the applications/programs being used, the screen scraping allows the system to compare more attributes of the current screen to the screens listed on the sensitive screen list and allows for a more detailed determination as to whether a current screen is on the sensitive screen list. The screen scraping will allow the system to understand the application components and the components associated metadata, current state, and text content. For example, where a field in the application is empty and is then updated to have text present such as a credit card number being copied into a field, the system can detect the contents before and after and this can be considered a change in state.

Through the use of keystroke monitoring, screen scraping, screen shots, etc. the system can determine current screen data 150 for the current desktop data 120 on an agent's desktop/terminal screen for each application/program in use (including metadata for each screen such as screen name), active time spent in each application/program window, text displayed and input into each application/program window, and actions the agent is performing. Not only can the DAE 140 determine what data has been recently input into an application/program (for example, data that was not present in the present in the previous state desktop data 122, but is present in the current state desktop data 120), it can also determine what data is present on the screen (either information that is accessed or information that is automatically populated, information previously input into the application, etc.). Therefore, the DAE can determine all data for each screen and distinguish previously input data from data input after the previous state desktop data 122. It can also determine what copy, cut, and past actions have taken place since the last capture of desktop data, and what information may have been input and deleted since the previous state desktop data 122 for each application/program. The DAE 140 can determine current screen data 150 for all applications/programs running on the system, not just the active application/program which may be viewed on the agent's desktop/terminal screen.

For each screen in the current screen data 150 that is on the sensitive screen list 132, the DAE 140 knows that sensitive data 199 is expected to be present. The DAE 140 can then determine if the sensitive data 199 is being correctly accessed, used, input, and/or manipulated and if the data should be sent to the VHS 160 for violation handling. Further the DAE 140 can implement sensitive data use rules 156 to enforce the appropriate access, use, input, and/or manipulation of known sensitive data 199. These aspects of the application will be described in further detail below.

Each screen on the sensitive screen list 132 includes at least one screen map 136. Each screen map 136 includes a listing of all fields in a particular screen, indications of which fields are allowed to contain sensitive data 199, the type of data allowed to be entered in a field, and how that data is allowed to be manipulated/accessed. The screen map 136 may be based on metadata associated with each field of the screen. Further, the screen map 136 may be modified/updated by the action rules 134 which may override and/or change the metadata associated with the screen and/or field of the screen.

In an embodiment, if the DAE 140 determines that the current state desktop data 120 includes current screen data 150 that include screens on the sensitive screen list 132, for each current screen data 150 that is on the sensitive screen list, the DAE will further analyze the current screen data 150 to determine if the sensitive data 199 is being used appropriately and will execute action rules 134 for the screens on the sensitive screen list 132. In an embodiment, the DAE may analyze the current screen data 150 against the screen map 136 to determine the presence of sensitive data in the current screen data 150 and whether it is being used properly (according to the screen map 136). Further the DAE may then analyze the current screen data 150 and metadata against action rules 134 to determine if the person accessing/using the screen has permission to do so. For example, for each screen on the sensitive screen list, the DAE 140 may perform an analysis of the current screen data 150 (including metadata) for each field of the current screen data 150 and based on the screen map(s) 136 for the current screen, create current screen field data 138 and a field data analysis 152. The current screen field data 138 is information about each field in the current screen, including the data in the field, the type of data in the field, any actions that have occurred with the filed since the previous state data (input, deletion, copy, past, etc.). Essentially, the DAE will take the current screen data 150 and group it by each field in the current screen and then analyze the data pertaining to each filed for the screen. Accordingly, the DAE may also determine the field data for the previous state desktop data during the analysis or may be provided that information from storage. The field data analysis 152 is the result of comparing the current screen filed data to the to the screen map(s) 136 to determine (for each filed in the current screen) if the field data contains sensitive data 199, the proper type of data allowed for each field, whether the data contained in the field or the use of the data in the field is improper (according to the allowed type of data for that filed), and correlates any sensitive data 199 to where it is stored, the type of sensitive data, and the identification of the customer to which the sensitive data 199 belongs. The field data analysis 152 may include the field name, type, contents, application, position, and other metadata that allows for unique identification of the data and whether these attributes correlate with the indicated attributes for the filed on the screen map 136. Optionally, the DAE stores the current screen data 150, field data analysis 152 and current screen field data 138 for further analysis and system development/teaching. For example, if a credit card number is entered into a field expecting an address or a birth date, the field data analysis will determine that the type of sensitive data entered is of the type credit card or account number and will determine that the allowed type is that of a date or an address, and will determine that the data in the field is not appropriate. This would occur if the data is present because it was being input, accessed, manipulated, stored etc. This analysis will also occur irrespective of the execution of action rules 134 (which are described in further detail below). If the data expected in the filed differs from the current data that is located in the field and the current data is sensitive data 199, the field data analysis 152 will include an indication that the presence of the data is inappropriate/not approved.

The DAE 140 may also perform different actions in relation to the current screen data 150 and current screen field data 138 based on action rules 134. The actions to be performed are actions that restrict the access, use, and/or manipulation of sensitive data 199 and actions that dictate the storage of sensitive data 199. For example, a screen in the current screen data 150 my may be known to contain sensitive data that can only be accessed by supervisors, such that the screen is on the sensitive screen list (as it is expected to contain sensitive data), but it should not be accessible by all persons in the CEC. The system uses the action rules 134 in conjunction with the current screen data 150 and metadata to automatedly perform actions in relation to the current screen data 150 if certain conditions are met. For example, if the filed data analysis 152 determines the appropriateness of a type of data in a particular filed, the action rules 134 control what happens to the data and the system based on the metadata associated with the data in the field (including, but not limited to the type of data, who is using the date, what customer the data is associated with, etc.). The action rules 134 are applied at least in part based on the screen maps 136 for screens on the sensitive screen list 132 for screens and/or fields known or expected to contain sensitive data 199. For example, If a regular CSR is attempting to access a screen that only a supervisor should access or that contains sensitive data that only a supervisor should have access to, the DAE may automatedly lock the CSR's access to that screen, redact particular sensitive data 199 in the accessed screen, lock the CSR's use of the system entirely, alert a supervisor or any number of other actions the DAE 140 may take in relation to the restriction of the access, input, copying, deletion, and/or manipulation of sensitive data. The action rules 134 are rules to automatedly regulate the access, input, and manipulation of sensitive data 199 in screens and fields expected to contain sensitive data if the conditions for that regulation are met. The rules are primarily based on the identity of the person attempting to use (access, manipulate, input) the sensitive data and/or sensitive data screen, the type of sensitive data expected to be used in the screen, and/or the type of use (e.g., input, access, manipulation, etc.). In an embodiment, to accomplish the automated regulation of known sensitive data 199, the DAE 140 may access/receive and apply action rules 134 based on the current state desktop data 120, the current screen data 150, and/or the current screen field data 138. The action rules 134 are screen/field specific but may be applied conditional on other data such as CSR, CSR type, customer, customer type, access, and access type. For example, the rules may include that only supervisor CSRs are allowed to copy sensitive data from a screen so if the system determines that a non-supervisor has copied sensitive data, the system may automatedly delete the data copied into the clipboard. Another example of an action rule 134 may be if the system requires the input of a password or security question for accessing certain data and the wrong password or security answer is entered, the system may automatically block that CSR's access to that data for a set period of time before allowing the CSR to try again. These are only examples of possible action rules 134 and should not be considered limiting.

The DAE 140 executes applicable action rules 134 based on the field data analysis 152 and current desktop data 120, current screen data 150, and/or current screen field data 138. The action rules are requirements for each screen on the sensitive screen list 132 to be carried out for the current screen data 150 as it relates to the access, input and manipulation of sensitive data 199 for the screen. The action rules 134 may be applicable to the screen as a whole or may be applicable only to certain fields for the screen. Further, the action rules 134 may be applied to a group of types of screens, all screens for a particular program/application and may be conditional to a particular group of agents, all agents, and even to individual agents. For example, if the current screen it is a sensitive screen (a screen on the sensitive screen list) that requires entering a customer's credit card information and storing it, the action rules may indicate that if the sensitive data (credit card information) has been entered, then the DAE is directed to store the sensitive data in a specified location and associate the sensitive data with other identifying information pertaining to the customer so the storage of the sensitive data can be easily tracked and located in the future, or may disallow copying the field data once the field data is entered, and/or may mask the field data once it is entered. Another example of an action rule may be instructions pertaining to what information on a sensitive screen is viewable by the agent accessing the screen. Each agent may have different access levels to customer's sensitive information. If an agent who does not have access to view a customer's credit card information attempts to access a screen that contains that information, the action rules may instruct the system to block the agent's access to the screen or to black out the fields on the screen that contain information the agent does not have access to view. Another example of an action rule may be an inability to enter sensitive data into a field. For example, it may be determined that agents are intentionally and/or inadvertently entering sensitive data (credit card number, address, driver's license ID number, etc.) in the wrong filed of the screen. An action rule for that screen could instruct the DAE to determine if sensitive information has been entered into the identified wrong field and remove the information from that field or block the manipulation of data in that field once it has been entered. Essentially the action rules 134 govern how sensitive information for the current screen is to be saved, accessed, entered, and manipulated for screens on the sensitive screen list 132.

Action rules 134 may be determined by a user of the system and/or may be automatically determined by the system based on the system's ability to learn and analyze use, input, access, and manipulation of sensitive data. In one embodiment, initially a system administrator or other user may determine action rules 134. Over time, the system may learn to determine additional action rules or modify action rules. Through this learning, the system may recommend action rules/changes to actions rules or may automatically create new actions rules/change current action rules. In an embodiment, the system may use machine learning to determine actions that agents perform and based on the patterns in the data determine whether those actions should be allowed, restricted to certain CSR types or data types, or completely prohibited. Based on this learning, the system can develop and/or modify action rules. In an embodiment, the system may receive historic field data analysis 152, violation handling information associated with the filed data analysis, and the metadata pertaining to the data in the field data analysis (person using the data, date and time of the use, customer associated with the data, etc.) to create new action rules 134 based on the analysis of the received historic data using machine learning and/or supervised machine learning. For example, if the historic data shows that a particular CSR has on more than one occasion input inappropriate data in a screen and the violation handling information shows that a screen lockout violation has been issued against that CSR for those instances, the system may learn that there should be a new action rule 134 for that CSR that if they attempt to access that screen in question, they will be locked out from that screen. In another example, if the historic data shows that a certain customer has had multiple issues with their sensitive data being used improperly by a certain level of CSR, the system may learn that there should be a new action rules indicating if that level of CSR attempts to use that customer's data (access, input, modify, ect.), that a notice should be provided to the CSR that this customer should only be assisted by a supervisor or a CSR of a higher level, the rule may also lock the current CSR out of further assisting/accessing that client's date.

As indicated above, for screens on the sensitive screen list 132, in addition to executing action rules 134 that pertain to controlling the input, access, manipulation, and storage of data on screens and in fields, the DAE 140 also determines if the attempted use, input, manipulation, storage, and/or access of the sensitive data 199 is appropriate on a field by field basis based on the type of data and the metadata associated with the data (CSR using data, client associated with the data, etc.). Whether the sensitive data 199 is being used/accessed/input/stored/manipulated appropriate is based on the field data analysis 152 performed by the DAE 140. If the field data analysis 152 determines that all use of sensitive date 199 analyzed by the field data analysis 152 in the current screen data 150 is an allowed use, the DAE takes no further action pertaining to the approved sensitive data 199 use and the system continues to monitor the CSR desktop 101. In other words, if the filed data analysis 152 determines that the use of the data is appropriate no violation handling is needed for the current state of the system. This, of course, can change if the screen maps change or if the action rules invoke violation handling. If the field data analysis 152 determines that the use of sensitive data 199 analyzed by the field data analysis is inappropriate, the DAE 140 creates a violation notice 131 and/or a human review notice 133. In an embodiment, the system analyzes the determination of inappropriate use of sensitive data 199 and assigns a confidence score to the determination of misuse. Depending on the confidence score, the system the notice created would be a violation notice 131 or a human review notice 133 such that higher confidence scores will result in violation notices 131, whereas lower confidence scores would require human review notices 133. The determination of higher confidence may be based on a threshold confidence or percentage of confidence. In an embodiment the notice could be a combination such that a 90% confidence score or above may result in a violation notice 131, a 70% confidence score up to 90% might result in both a violation notice 131, but still result in a human review notice 133 to verify the violation notice 131, and a confidence score of below 70% might just result. It should be understood, that these are merely examples of how the confidence of a determination may be made and how the system may determine to issue a violation notice 131 over a human review notice and should not be considered limiting.

Since screens on the sensitive screen list have been mapped to indicate appropriate use of sensitive data 199, any use of sensitive data 199 outside of the mapped parameters would be considered a violation. The DAE 140 sends the violation notice 131, which may include the inappropriate sensitive data 199, the current desktop data 120, the current screen data 150, the current screen field data 138, the field data analysis 152, any other data available to the DAE pertaining to the inappropriate sensitive data 199, and metadata associated with the included data to the VHS to perform automated actions to be taken for the violation. The DAE 140 sends any human review notices 133 to a supervisor or employee, or log for review of the violation. The human review notice 133 may include, but is not limited to, the inappropriate sensitive data 199, the current desktop data 120, the current screen data 150, the current screen filed data 138, the filed data analysis 152, metadata associated with the included data, and any other data available to the DAE pertaining to the inappropriate sensitive data 199. It should be understood that a violation may trigger one or both violation notice(s) 131 and a human review notice 133.

The violation notice 131 and the human review notice 133 may include an indication of the sensitive data 199, the screen and field of the current desktop data 120 being violated, any action rules 134 that were applied to the sensitive data 199, and the type of violation that occurred. The type of violation may include a categorization of the type of sensitive data and the type of action that caused the violation (for example, inputting sensitive data in a filed it was not expected, copying sensitive data when improper, accessing sensitive data when improper, etc.). Violation handling and human review will be discussed in more detail below.

In addition to known or predicted use, access, input and/or manipulation of sensitive data 199 in screens that are anticipated to contain sensitive data, a screen may contain sensitive data 199 or have sensitive data input, deletion, and/or manipulation even if it is not anticipated to contain sensitive data 199 or is not on the sensitive screen list 132. This is precisely some of the behavior the application is designed to detect. For example, a CSR may copy a customer's social security number into a notepad application or an email application. It is likely these applications/screens are not on the sensitive screen list 132 because the system does not expect/predict this type of use of sensitive data 199. It is desirous for the system to detect exactly this type of unauthorized use of sensitive data 199.

In an embodiment, for all screens in the current screen data 150 not on the sensitive screen list 132, the DAE 140 will analyze the current screen data 150 based on a set of received sensitive data patterns 154 to determine if any of the current screen data 150 includes sensitive data 199. It should be understood that what is considered sensitive data 199 for screens not on the sensitive screens list 132 may be different than what is considered sensitive data 199 for screens on the sensitive screen list. This may be due, at least in part, to the lack of screen map and ability to make field by field determinations for screens not included in the sensitive screen list. If sensitive data 199 is present, input, displayed, in use, and/or manipulated based on the analysis, the DAE can then determine if the use, access, input, and/or manipulation is appropriate, if a supervisor should be alerted to the use, if the screen should be added to the sensitive screen list and if the data should be sent to the VHS 160 based on the sensitive data use rules 156. These aspects of the application will be described in further detail below. In another embodiment, the DAE 140 may perform the above analysis for all current screen data 150, whether or not the screen is on the sensitive screen list 132.

The sensitive data patterns 154 are model text patterns that have been determined to likely match sensitive data 199 that may be input and/or accessed in the system. The sensitive data patterns 154 may be predetermined models and can be different for each organization/system to accommodate differences in systems and sensitive data stored in the system. Language processing techniques can identify sensitive data patterns 154 based on what the organization defines as being sensitive data, for example, addresses, names of people, medical records, phone numbers all follow or include a standard pattern that can be matched against data. For example, a sensitive data pattern for a particular brand of credit card may be 4XXXXXXXXXXXXXXX. A sensitive data pattern for a social security number may be XXX-XX-XXXX. A medical record or other document may start and end with certain indicators. It should be understood that these are merely simple examples of possible sensitive data patterns 154. It should be further understood that the sensitive data patterns 154 can be as complex as required by the sensitive data that may be input and accessed within the system. Further, the system can be trained to recognize and determine sensitive data patterns 154 automatedly through the labeling of fields and screens known or expected to contain sensitive data and the analysis of data that is used in those fields and considered by the system to be an appropriate use of said sensitive data 199. The training can be ongoing each time a new screen is added to the sensitive screen list 132 and each time a new filed is indicated to contain sensitive data. Accordingly, the sensitive data patterns 154 can be dynamically updated based on the training. Further, the sensitive data patterns 154 can be manually updated by a system user such as a manager or IT professional. Through this learning process, the system may be able to implement a consistent treatment of sensitive data 199 both included is screens known/expected to contain sensitive data and screens not known/expected to contain sensitive data. The learning can be performed using historic processed data for screens on the sensitive screen list in batches or as the data is processed in near real-time to initial processing.

As indicated above, if the DAE 140 determines that the current screen data 150 contains sensitive data 199 and is not on the sensitive screen list 134, the DAE 140 can still determine if the use/access/insertion/manipulation of the sensitive data 199 is appropriate and can enforce preexisting sensitive data use rules 156 and create violation notices 131 and/or human review notices 133 based on the analysis and application of sensitive data use rules 156.

In embodiments where the DAE 140 determines sensitive data 199 is present, accessed, in use, inserted, deleted, manipulate, etc. through the sensitive data patterns analysis, the DAE 140 receives sensitive data use rules 156 and analyzes the sensitive data use in the current desktop data 120 to determine if the use of the sensitive data 199 is inappropriate and if the sensitive screen list 132 and screen maps 136 should be updated based on the sensitive data 199 use.

The sensitive data use rules 156 control and determine the allowed and disallowed use of sensitive data 199 in screens and fields that have not been already determined to likely contain sensitive data (unlike screens on the sensitive screen list or fields that have been identified as likely to contain sensitive data). The sensitive data use rules may also be used in screens on the sensitive screen list for fields that are not expected to contain sensitive data but are determined to contain sensitive data.

The sensitive data use rules 156 may be predetermined rules. While these rules can be field specific, and screen specific, these rules are likely to be more generalized to application/program specific, customer specific, and/or agent specific rules as these screens have not been fully analyzed and mapped like the screens on the sensitive screen list 132 or are fields in screens on the sensitive screen list not anticipated to contain sensitive data. The sensitive data use rules 156 may also direct or indicate that certain use of sensitive data 199 in a screen and/or field should cause the screen to be added to the sensitive screen list 132 and have a screen map 136 created for the screen. For example, a sensitive data use rule may indicate that all agents assigned to the payment section of a CEC are allowed to input sensitive data patterns for credit cards in any field (even if it is not a field or screen that has been already indicated to contain sensitive data), whereas if the agent is not assigned to the payment section of a CEC, the sensitive data rules may prohibit the agent from inputting/manipulating any sensitive data that matches the sensitive data patterns for a credit card number or may restrict where and how that agent can input/manipulate said sensitive data. Another sensitive data use rule may indicate that no agents, including agents in the payment section, are allowed to perform a copy/cut action on any field that contains data that matches a sensitive data pattern for credit cards. Another example of a sensitive data use rule may be that no sensitive data (so any data that matches any sensitive data pattern) is allowed to be contained in any field in a particular application (for example perhaps no sensitive data is allowed to be accessed, input, presented, or modified in any email program). It should be understood that the above are merely examples of possible sensitive data use rules 156 and should not be considered limiting.

If the DAE 140 determines that the use of sensitive data 199 violates the sensitive data use rules 156, the DAE 140 creates a violation notice 131 and/or a human review notice 133. In an embodiment, the system analyzes the determination of inappropriate use of sensitive data 199 and assigns a confidence score to the determination of misuse. Depending on the confidence score, the system the notice created would be a violation notice 131 or a human review notice 133 such that higher confidence scores will result in violation notices 131, whereas lower confidence scores would require human review notices 133. The determination of higher confidence may be based on a threshold confidence or percentage of confidence. In an embodiment the notice could be a combination such that a 90% confidence score or above may result in a violation notice 131, a 70% confidence score up to 90% might result in both a violation notice 131, but still result in a human review notice 133 to verify the violation notice 131, and a confidence score of below 70% might just result. It should be understood, that these are merely examples of how the confidence of a determination may be made and how the system may determine to issue a violation notice 131 over a human review notice and should not be considered limiting.

In an embodiment, the DAE 140 sends the sensitive data 199, the current desktop data 120, the current screen data 150, and violation notice 131 to the VHS to perform automated actions to be taken for the violation. In an embodiment, the DAE 140 sends any human review notices 133 to a supervisor or employee, or log for review of the violation. It should be understood that a violation may trigger one or both violation notice(s) 131 and a human review notice 133.

In an embodiment the DAE 140 sends the violation notice 131 to the VHS. In this embodiment, the violation notice 131 may include, but not be limited to, the inappropriate sensitive date 199, the current desktop data 120, the current screen data 150, metadata associated with the included data, and any other data available to the DAE pertaining to the inappropriate sensitive data 199. In an embodiment the DAE 140 sends the human review notice 133 to a supervisor or other designated employee or a log for review of the violation. The human review notice 133 may include, but not be limited to, the inappropriate sensitive date 199, the current desktop data 120, the current screen data 150, metadata associated with the included data, and any other data available to the DAE pertaining to the inappropriate sensitive data 199. The violation notice 131 and the human review notice 133 may include an indication of the sensitive data 199, the screen and field of the current desktop data 120 being violated, any sensitive data use rules 156 that were applied to the sensitive data 199, and the type of violation that occurred. The type of violation may include a categorization of the type of sensitive data and the type of action that caused the violation (for example, inputting sensitive data in a filed it was not expected, copying sensitive data when improper, accessing sensitive data when improper, etc.).

Violation notices 131 and human review notices 133 contain information about the determined violation that has occurred so that the VHS 160 or the human reviewer can determine how the violation should be handled this is the case for all violation notices 131 and human review notices 133 whether generated by the DAE, VAE, or AAE. The only difference between the notices generated by these modules is the data that is included and/or accompanies the notice. The primary difference between a violation notice 131 and a human review notice 133 is the violation notice 131 can be automatedly handled by the VHS 160, whereas the human review notice 133 requires human review to determine how to handle the violation. Violation notices 131 and human review notices 133 generated by the DAE may include, but are not limited to, the current state data 120 that is determined to be a violation, the current screen data 150 that is determined to be a violation, the sensitive data patterns 154 determined to be violated, the sensitive data use rules 156 determined to be violated, applicable filed data analysis 152, current field data 138, screen maps 136 related to the data that is involved in the violation, action rules 134 implemented, and any other determinations and analysis from the DAE 140 regarding the violation.

The DAE 140 may further determine that the screen identified to contain the sensitive date 199, should be included on the sensitive screens list 132 and have a screen map 136 created. This can be accomplished in a number of ways. In one embodiment, the DAE 140 may provide a notice to the system that a review of the screen should occur for a human determination if the screen should be included in the sensitive screens list 132. For example, if the analysis of the screen determines that sensitive data 199 is present, the DAE 140 may notify a supervisor of the screen and the supervisor may review all instances of sensitive data use (proper or improper) for the screen and determine that sensitive data is frequently entered into the screen and that it should be on the sensitive screen list 132 and have a screen map 136 to enable the screen to have action rules 134 applied to it. In an embodiment, the review of the screen can be performed by the DAE 140 or other part of the system. This can be accomplished through sensitive data use rules 156 and allowing the system to access historic and saved data about the screen, the types of violations for sensitive data that have occurred with the screen, and any other data required for the system to apply the sensitive data use rules 156 to the screen to determine if the screen should be added to the sensitive screen list 132.

If the DAE 140 determines that no sensitive data 199 is present, accessed, in use, input, and/or manipulated in the current screen data 120, the DAE ends its process until new current screen data 120 is received. If the DAE 140 determines that sensitive data 199 is present, but is permissible, the DAE executes any applicable sensitive data use rules 156 and/or action rules 134 to track and correlate the storage of the sensitive data 199. The SMS continues to monitor and send appropriate new current desktop data 120 to the DAE 140 for analysis and processing. Optionally, at the end of processing the current desktop data 120, the DAE may store the current screen data 150, the current desktop data 120, and any other created data for further analysis and system development/teaching.

It should be understood that the DAE 140 tracks the location and storage of all identified sensitive data 199 and correlates the stored sensitive data with at least a data type and a customer identification. The system can capture the application/program and context of the application screen when sensitive data is determined to be present and create a location unique identifier for the application screens present when sensitive information is matched. The system can then store the sensitive information based on the location unique identifier and the data type. This enables the system to locate all sensitive data 199 related to a specific customer and/or all sensitive data 199 stored in the system of a particular data type. Therefore, when a law governing the storage of sensitive data 199 changes, the location of the sensitive data 199 can be easily determined. Further, if a customer calls and requests identification of their sensitive data 199 stored by the system and/or removal of that sensitive data 199, that customer's sensitive data can be easily found and removed.

CEC system 100 also includes a video analysis engine (VAE) 170 having a VAE software module 171 and optional VAE storage 172 for processing and analyzing video data to determine the presence of sensitive data 199 and the appropriate use of sensitive data 199. VAE 170 may be a processor or a combination of a processing system and a storage system. VAE 170 receives current state video data 124 from the SMS 110 and analyzes it to determine if the current state video data 124 contains sensitive data 199 or indicators of sensitive data and determines if the sensitive data 199 is appropriate or involves a violation regarding the use of sensitive data 199. The VAE 170 may receive current state video data 124 when the SMS 110 has determined that the current state video data 124 has changed from the previous state video data 126. In an embodiment, the VAE 170 may receive all current state video data 124 from the SMS 110. Optionally, the VAE 170 also receives the current state desktop data 120 (if available), the video data 104, and the previous state video data 126 from the SMS 110 to aid in processing and analysis. The data received by the VAE 170 also includes the metadata associated with said data, as described herein both above and below. Analyzing the current state video data 124 in conjunction with the current state desktop data 120 enables the VAE 170 to confirm the presence of sensitive data 199 on the desktop at the same time as the inappropriate/questionable action occurs in the current stat desktop data 124.

There are many ways the VAE 170 can analyze the current state video data 124 to determine if sensitive data 199 and or sensitive data indicators are present/in use and if the sensitive data use is appropriate. In an embodiment, the identification of sensitive data 199 in the current video data 124 involves identifying sensitive objects/behaviors 186 in the current video data 124, analyzing the sensitive object 186 in conjunction with the rest of the current video data 124 (and optionally previous state video data 126 and current desktop data 120) to determine if the sensitive object is a violation of the sensitive object rules 144. In an embodiment, the VAE 170 analyzes the current state video data 124, identifies and classifies objects 182 in the current state video data 124. The VAE then compares the identified objects 182 to a set of objects on a sensitive objects list 180 to determine if the identified objects 182 are sensitive object 186. The analysis of the current state video data 124 may utilize video analytics and image recognition to identify and classify objects in the current state video data 124. Further the identification of sensitive objections 186 may be dependent on other objects 182 identified in the current state video 124 or not present in the current state view 124 or present/not present in the current state desktop data 120 (if being used in the analysis).

For all identified objects 182 on the sensitive object list 180, the VAE 170 will mark them as sensitive objects 186. Sensitive objects 186 are then analyzed against sensitive object rules 144 to determine if the sensitive object 186 in the current video data 124 is considered impermissible sensitive data 199. Additionally, the analysis may include utilizing the prior state video data 126 and/or the current state desktop data 120 in combination with the current state video data 124 and the sensitive object rules 144 to determine if sensitive objects 186 in the current state video data 124 are improper use of sensitive data 199. If the sensitive object 186 is determined to violate sensitive object rules 144, the VAR 170 will create a violation notice 131 and/or a human review notice 133. In an embodiment, the system analyzes the determination of inappropriate use of sensitive data 199 and assigns a confidence score to the determination of misuse. Depending on the confidence score, the system the notice created would be a violation notice 131 or a human review notice 133 such that higher confidence scores will result in violation notices 131, whereas lower confidence scores would require human review notices 133. The determination of higher confidence may be based on a threshold confidence or percentage of confidence. In an embodiment the notice could be a combination such that a 90% confidence score or above may result in a violation notice 131, a 70% confidence score up to 90% might result in both a violation notice 131, but still result in a human review notice 133 to verify the violation notice 131, and a confidence score of below 70% might just result. It should be understood, that these are merely examples of how the confidence of a determination may be made and how the system may determine to issue a violation notice 131 over a human review notice and should not be considered limiting. In an embodiment, the VAE 170 sends the current video data 124, the identified sensitive objects 186 in the current video data 124, and violation notice 131 to the VHS 160 to perform automated actions to be taken for the sensitive object 186. The VAE 170 sends any human review notices 133 to a supervisor or employee, or log for review of the sensitive object 186. It should be understood that a sensitive object may trigger one or both violation notice(s) 131 and a human review notice 133. Optionally, the VAE may also send the identified objects 182 in the current state video data 124 to the VHS along with the other information. In an embodiment, all sensitive objects 186 identified in the current state video data may generate a human review notice 133, even if they do not violate the sensitive object rules 144. Through this review, the sensitive data objects list can be updated and the sensitive object rules 144 can be updated.

Optionally, if there are objects in the current state video data 124 that the VAE 170 is unable to identify, the VAE 170 may mark those objects as unidentified objects 184. The VAE 170 may then pass the unidentified objects 184, the current state desktop data 120 (if available), and the current state video data 124 to a supervisor and/or log for human review to identify and classify the unidentified objects 184. The sensitive objects list 180 can then be dynamically updated to include newly identified sensitive objects.

In an embodiment, the VAE 170 may also include a non-sensitive object list (not depicted). In this embodiment, the identified objects 182 are compared to the sensitive object list 180 and the non-sensitive object list, the objects 182 are then labeled as sensitive objects 186, non-sensitive objects (not depicted), or unidentified objects 184. In this embodiment, again only the unidentified objects are sent for additional review to determine whether they are sensitive objects or non-sensitive objects.

Video data 104 may include, but is not limited to, incoming and outgoing video data from the desktop camera and other potential cameras where the agent is in view. The video data 104 may include a screen shot from the current state of the desktop video camera and a screen shot of the current state of any other cameras where the agent is in view. Video data can be run through video analysis to generate a stream of text and images coupled with metadata. The current state video data 124 may include all of the same data as the video data 104 but is limited to the data for the present state of the video data 104. The video data 104 may include, but is not limited to, all previous definitions and descriptions provided herein of video data 104.

The sensitive objects list 180 contains models of video objects that have been determined to indicate the possible improper use of sensitive information/data 199. Sensitive objects on the sensitive object list 180 can be predetermined for each system and/or organization based on what has been determined to be indicative of sensitive data 199 being improperly used. In general, the sensitive object list 180 will consist of objects that the system has determined should not be present in videos. This list may initially be fully human defined for each organization, but the system may learn based on machine learning and pattern recognition over time of additional objects that should be included on the sensitive object list. The sensitive object list 180 can be dynamically updated when new video objects are determined to indicate the improper use of sensitive data 199. Potential examples of sensitive objects may be, but are not limited to, an agent's personal cell phone, a pen, a notepad, a credit card, etc. It should be understood that these are merely examples of objects that may be included on the sensitive object list 180 and should not be considered limiting. It should further be understood that the objects on the sensitive object list 180 may be considered sensitive data 199 (e.g., the credit card number on a credit card being captured by the video data). However, it should further be understood that the objects on the sensitive object list, may not contain any sensitive data 199 and may merely be indicative of the possibly misuse of sensitive data (if it is present). For example, if the customer presents a credit card, but the video data does not actually capture the credit card number or if the CSR takes out a pen and paper while on a phone call. The presence of these objects may indicate that sensitive data is present (credit card presented in video) or may indicate abnormal behavior (using pen and paper while on phone call with customer).

Sensitive object rules 144, are rules that indicate permissible or impermissible use of sensitive objects 186. In an embodiment, the sensitive object rules 144 are conditional rules where if certain video data conditions are met, the identified sensitive object will be indicated to be appropriate or inappropriate. The conditions be based on, but not limited to, current state video data, previous state video data and current state desktop data, metadata for the video data and desktop data, and any other data available to the VHS. For example, in a CEC where the agent handles customer calls and emails through the CEC system, if the agent takes out their personal cell phone (a sensitive object 186), it may be an indication that the agent is improperly attempting to copy or take a picture of sensitive data 199 appearing on the agent's desktop/terminal. A sensitive object rule 144 may indicate that if the video analysis determines that from the video analysis it is determined that the cell phone is being used as a camera (rather than held up to the agent's ear as if they are talking on it) that is a violation and an impermissible use of the sensitive object 186. In another embodiment, the sensitive object rule 144 may indicate that if the current state desktop data contains sensitive data 199 at the same time that the current state video data shows the personal cell phone (a sensitive object 186) that is a violation and an impermissible use of the sensitive object 186. In another embodiment, a sensitive object rule may indicate that if the current state desktop data does not contain sensitive data 199 at the same time that the current state video data shows the personal cell phone (a sensitive object 186) that is a permissible use of the sensitive object 186 and does not constitute a violation. Another sensitive object rule 144 may indicate that if the video analysis determines that an agent cell phone (a sensitive object 186) and a credit card (a sensitive object 186) are present in the video that is an indication of impermissible use of sensitive data 199. Another example involves the sensitive object 186 of pen and paper. The sensitive object rule 144 may be if the agent is capable of performing all actions through the use of the agent's computer (this condition would be based on the agent type or other metadata related to the identification of the agent), if the agent were to take out a pen and/or notebook (both identified as sensitive objects 186) it may be an indication that the agent is improperly attempting to write down sensitive data they have input or accessed through the system. This rule could further be conditioned on the VHS determining that sensitive data was also present on the current state desktop data. Another example may be if the agent is a CSR where customers interact with the agent in person and the agent holds up the customer's credit card (a sensitive object 186) to the video screen or a camera. This could be an indication that the agent is improperly attempting to capture an image of the customer's credit card information. It should be understood that these are merely examples of sensitive objects 186 and sensitive object rules 144 should not be considered limiting. Analysis of the current state desktop data 120 can be performed using the processes and methods described above and the data and information determined from that analysis can be corelated with the current state video data. The sensitive object rules 144 can be based on any data that is determined from the data available to the system including video data, audio data, and desktop data.

The non-sensitive objects list (not pictured) contains models of video objects that have been determined to be objects that do not indicate a possible improper use of sensitive data/information 199. Models included in the non-sensitive object list can be predetermined for each system and/or organization based on what has been determined to be indicative of objects that would not indicate the improper use of sensitive data 199. The non-sensitive object list can be dynamically updated when new video objects are determined to not indicate the improper use of sensitive data 199. While an object may be listed on the non-sensitive objects list, this does not mean that the presence of an object on the non-sensitive data list cannot be included in the conditions for the sensitive object rules 144. Further the presence of objects on the non-sensitive object list does not mean that the current state video data does not need to be analyzed and each object identified as a sensitive object processed with the sensitive object rules 144. It just means that object does not need to be processed through the sensitive object rules.

It should be understood that the VAE 170 may contain several versions of the sensitive objects list 180 and/or the non-sensitive objects list. These lists may be applied to the current state video data 124 depending on a number of factors relating to the video data expressed in the video metadata. For example, a list may apply only to CSRs/agents in a specific department or individual CSRs and/or CSR groups. For example, it may be common for CSRs/agents in one section to need to write down information when handling a customer inquiry, but in another section this practice may be prohibited. Therefore, each section may have different objects that would be considered sensitive objects. Further, the system may learn from the models on one list and suggest that those models be added to other lists. Additionally, it should be understood that the sensitive object rules 144 can be conditioned on a number of factors including, but not limited to, object, CSR, department dependent, etc.

Violation notices 131 and human review notices 133 contain information about the determined violation that has occurred so that the VHS 160 or the human reviewer can determine how the violation should be handled. The primary difference between a violation notice 131 and a human review notice 133 is the violation notice 131 can be automatedly handled by the VHS 160, whereas the human review notice 133 requires human review to determine how to handle the violation and to determine if an actual violation has occurred. In an embodiment, the violation notice 131 and the human review notice 133 may include, but is not limited to, identification of sensitive objects determined to have violated the sensitive object rules 144, and any other data available to the VAE 170 including, but not limited to the current state video data 124, the identified sensitive objects 186, the sensitive object rules 144 (all of them or just the rules determined to have been violated) the previous state video data 126, the current state desktop data 120, the unidentified objects 184 (discussed further below), metadata associated with the included data, and any other data available to the VAE 170 associated with the improper use of sensitive data 199. Violation notices 131 and human review notices 133 may include, but are not limited to, the sensitive data 199 (sensitive object 186 determined to violate sensitive object rules 144), the current state video data 124 that is determined to be a violation, the determined sensitive objects 186, the unidentified objects 184 in the video data, the type of violation which would include the sensitive object rule(s) 144 that were violated, and any other determinations and analysis from the VAE 170 regarding the violation. The type of violation may include a categorization of the type of sensitive data and the type of action that caused the violation (for example, having a credit card and an agent cell phone in the current video data). Optionally the VAE will store the violation notice 131, the human review notice 133, the identified objects 182, the unidentified objects 184, the sensitive objects 186, and the sensitive data 199 for later analysis and use.

CEC system 100 also includes an audio analysis engine (AAE) 190 having an AAE software module 191 and optional AAE storage 192 for processing and analyzing audio data to determine the presence of sensitive data 199, or sensitive data indicators (sensitive data phrases, and/or voice print including stress level/sentiment for the audio data), collectively referred to when discussing the AAE as sensitive data 199 and the appropriate use of sensitive data 199. AAE 190 may be a processor or a combination of a processing system and a storage system. AAE 190 receives current state audio data 128 from the SMS 110 and analyzes it to determine if the current state audio data 128 contains sensitive data 199 or sensitive data indicators (verbal and/or emotional), determines if the sensitive data 199 is appropriate or involves a violation regarding the use of sensitive data 199, and determines a sentiment and sentiment metadata 188 for the current state audio data 128. The AAE 190 may receive current state video data 128 when the SMS 110 has determined that the current state audio data 128 has changed from the previous state audio data 130. In an embodiment, the AAE 190 may receive all current state audio data 128 from the SMS 110. Optionally, the AAE 190 also receives the current state desktop data 120 and/or the previous state audio data 130 from the SMS 110 to aid in processing and analysis. The data received by the AAE 190 also includes the metadata associated with said data, as described herein both above and below.

There are many ways the AAE 190 can analyze the current state audio data 128 to determine if sensitive data 199 is present/in use and if the sensitive data use is appropriate. In an embodiment, the AAE 190 may convert the current state audio data 128 to a textual transcript 108 of the audio data and create sentiment and sentiment metadata 188 for the current state audio data 128. The AAE 190 may then compare the textual transcript 108 of the audio data to a set of sensitive data words and phrases 121 to determine if any of the audio data in the textual transcript 108 is considered to include sensitive data 199. Further, the AAE 190 may also analyze the current state audio data 128 to determine sentiment metadata 188 for each speaker and compares the sentiment metadata 188 to a set of normal parameters 123 to determine if there are any stressors or emotional indicators out of normal parameters 123. If it is determined that sensitive data 199 is present in the textual transcript or that the sentiment metadata 188 is outside of normal parameters, the current state audio data 128, the sensitive data 199 and/or the sentiment metadata 188 is analyzed against audio sensitive data use rules 103 to determine if the use of sensitive data and/or the sentiment metadata is improper.

The sensitive data/sensitive phrase list 121 contains models of words, utterances, and phrases that are considered to include sensitive data, request sensitive data, and/or is indicative of the presence of sensitive data. The audio sensitive data use rules 103 include rules as to how sensitive data/phrase list 121 models are applied to new audio data to determine if the sensitive data 199 is appropriate. Sensitive data/sensitive phrases 121 can be predetermined for each system and/or organization to identify sensitive data 199. The audio sensitive data use rules 103 are based on what has been determined to be indicative of sensitive data being improperly used/requested. Potential examples of sensitive phrases/words and improper use may be, but are not limited to, reciting a customer's credit card number by the agent, requesting that a customer email their credit card information, asking a customer's age, etc. Sensitive phrases/words may also include, but are not limited to sensitive data 199 itself defined above in reference to sensitive data for desktop analysis, for example, IP address, phone number, account number, etc. Depending on the organization/industry what may be appropriate and inappropriate requests for sensitive data may vary greatly. It should be understood that these are merely examples of sensitive data/sensitive phrases and should not be considered limiting. It should be understood that the audio sensitive data use rules 103 contains rules that indicate when the use of the sensitive phrase/sensitive data in audio text is inappropriate. These rules can be applied to individual agents, groups of agents, all agents, etc., depending on how the rules are assigned. For example, a credit card number may be identified in the current state audio data by the sensitive phrases list 121. The sensitive phrases list 121 may apply a credit card model to the credit card number and determine that sensitive data was present in the form of a credit card number. The sensitive data and current state audio data may then be analyzed against the audio sensitive data use rules 103 and determine that the use of sensitive data in the current state audio data may be a violation of the audio sensitive data use rules 103 because the agents spoke the credit card number out loud (whereas if spoken by the client, might not violate the audio sensitive data use rules 103).

The normal parameters 123 are predetermined intent and/or voice print parameters that indicate what sentiment metadata are considered to be acceptable and do not require violation handling.

If the analysis of the textual transcript 108 determines that a violation of the audio sensitive data use rules 103 has occurred, the AAE 190 creates a violation notice 131 and/or a human review notice 133. The AAE 190 sends the violation notice 131 to the VHS 160. The AAE may also transfer current state audio data 128, the textual transcript 108, the sentiment metadata 188, and the sensitive data/phrase 121 that is violated to the VHS 160 for further processing, including the type of violation which would include the phrase from the sensitive phrase list 121, the audio sensitive data use rules 103 that were violated, and the normal parameters 123 that were violated that has occurred. The AAE 190 sends any human review notices 133 to a supervisor or employee, or log for review. It should be understood that the AAE 190 may create trigger one or both violation notice(s) 131 and a human review notice 133. In an embodiment, the violation notice 131 may include, but is not limited to identification of the sensitive data 199 in the current state audio data, the sensitive phrases list 121 (either the entire list or the model(s) that was applied to the identified sensitive data 199), the audio sensitive data use rules 122 that were violated, the current state audio data, the previous state audio data, the current state desktop data 120, all metadata associated with the included data, and any other data available to the AAE that pertains to the identified sensitive data 199. In an embodiment, the human review notice 133 may include, but is not limited to identification of the sensitive data 199 in the current state audio data, the sensitive phrases list 121 (either the entire list or the model(s) that was applied to the identified sensitive data 199), the audio sensitive data use rules 122, the current state audio data, the previous state audio data, the current state desktop data 120, all metadata associated with the included data, and any other data available to the AAE that pertains to the identified sensitive data 199.

If the analysis of the current state audio data 128 indicates that the sentiment metadata 188 is outside of the normal parameters 123, the AAE 190 creates a violation notice 131 and/or a human review notice 133. The AAE 190 sends the violation notice 131 to the VHS 160. The AAE may also transfer current state audio data 128, the textual transcript 108, and the sentiment metadata 188 to the VHS 160 for further processing. The AAE 190 sends any human review notices 133 to a supervisor or employee, or log for review. It should be understood that the AAE 190 may create trigger one or both violation notice(s) 131 and a human review notice 133. In an embodiment, the violation notice 131 may include, but is not limited to the sentiment and sentiment metadata 188, the normal parameters 123, identification of the sensitive data 199 in the current state audio data, the sensitive phrases list 121 (either the entire list or the model (s) that was applied to the identified sensitive data 199), the current state audio data, the previous state audio data, the current state desktop data 120, all metadata associated with the included data, and any other data available to the AAE that pertains to the identified sensitive data 199. In an embodiment, the human review notice 133 may include, but is not limited to the sentiment and sentiment metadata 188, the normal parameters 123, identification of the sensitive data 199 in the current state audio data, the sensitive phrases list 121 (either the entire list or the model(s) that was applied to the identified sensitive data 199), the current state audio data, the previous state audio data, the current state desktop data 120, all metadata associated with the included data, and any other data available to the AAE that pertains to the identified sensitive data 199.

Violation notices 131 and human review notices 133 contain information about the determined violation that has occurred so that the VHS 160 or the human reviewer can determine how the violation should be handled. The primary difference between a violation notice 131 and a human review notice 133 is the violation notice 131 can be automatedly handled by the VHS 160, whereas the human review notice 133 requires human review to determine how to handle the violation. Violation notices 131 and human review notices 133 may include, but are not limited to, the current state audio data 128 that is determined to be a violation, the portion of the textual transcript 108 that is determined to contain the violation, the sentiment metadata 188, the sensitive data/phrases 121 that are determined to be violated, the normal parameters 123 that the audio data is determined not to comply with, and any other determinations and analysis from the AAE 190 regarding the violation. Optionally the AAE 190 will store the violation notice 131, human review notice 133, sensitive data 199, sentiment and sentiment metadata 188, and textual transcript 108 for later analysis and review.

CEC system 100 also includes a violation handler system (VHS) 160 having a VHS software module 161 and optional VHS storage 162 for receiving violation notices 131 and automatedly determining how to handle the violation notices 131. The VHS 160 analyzes the violation notices 131 and any additional data sent with the violation notice against violation determination rules 105 and determines what violation actions 127 should be implemented based on the analysis. In addition to analyzing the violation notice 131 and accompanying data, the VHS 160 may also analyze stored data relating to any other data that may be correlated to the violation 131 including the agent, the customer, violation type, data type, etc. Further, the VHS 160 automatedly executes the determined violation actions 127. The violation determination rules 105 may be based on the type/severity of the violation, the number of violations a CSR or CSR group has had, the type of sensitive data involved in the violation, the rules violated by the use/access/manipulation/input of the data and any combination therefore. For example, the VHS may receive or request violation data associated with the CSR associated with the violation notice 131 and may determined the violation action(s) based in part on an analysis of the violation data associated with the CSR, which may be all violation data associated with the CSR or violation data only associated with the type of violation notice. For example, if the CSR has had a lot of violations in a particular period of time (for example above a certain threshold number and within a determined period of time) the violation action 127 may be more severe than if the CSR's violations for that same period of time were less than the threshold number. As another example, the total number of violations for the CSR might not be weighed as heavily as the type of violations for the CSR. The above are examples of complicated violation handling determinations implemented by the violation determination rules 105 and the analysis of violation data. In embodiments, the VHS may employ simple violation handling determinations where the number of violations a CSR has had is not taken into consideration and the VHS only considers the data provided with the violation notice 131. In embodiments, the violation determination rules 105 may be updated using machine learning where the system analyzes the behaviors and violations determined by supervisors and teaches itself to update the violation determination rules 105.

The violation actions 127 are options that the system may choose to implement due to the violation notice 131 received by the VHS 160. These actions may be implemented against the agent that the violation notice was associated with, against all agents, may be applied to certain screens, certain fields in certain screens, all screens, certain programs/applications, all applications/programs, etc. The violation actions 127 are predetermined actions that can be updated manually. Some examples of violation actions may be, but are not limited to, notifying the agent that a violation has occurred, notifying the agent's supervisor that a violation has occurred, blocking and/or restricting the agent's access to field data, screen data, and/or program/application data, restricting the agent's actions in the application/program (for example blocking copy/cut/paste actions, or blocking the agent's ability to type in a notepad application when another specific application is open), flagging the agent and/or group of agents for training, flagging the agent and/or group of agents for additional supervision (for example monitoring agent using audio/video technology), conducting an audit of the agent's desktop usage over time, and automatically locking the agent out of the system or out of the program/application (for example automatedly blocking the agent's use of email). Violation actions 127 may include automatedly creating/updating action rules 134, screen maps 136, sensitive screen list 132, sensitive data patterns 154, sensitive data use rules 156, sensitive object list 180, sensitive object rules 144, normal sentiment parameters 123, and/or sensitive data and phrases list 121 to be implemented for the agent, the type of data, the field, the screen, etc. based on machine learning techniques learned from supervisor actions. It should be understood that the above are merely examples of violation actions and the violation actions can be customized to fit each organization's needs. It should be understood that more than one violation action 127 could be implemented for a single violation notice 131. For example, if it is determined that an agent from a particular agent group has attempted to copy sensitive information from a field where copying is not allowed, a violation action 127 may be to alert the agent that action is not allowed. If it has been determined that this particular agent has done this on more than one occasion (from historic agent data for that CSR correlated to the particular screen) then the violation action 127 might be to mask the data in that field of the screen and to send a notice of the violation to the supervisor, otherwise the violation might be to update the action rules 134 to permanently or for a predetermined time (until changed) mask the data in that field or screen for that agent. If it has been determined that this particular agent group has had similar issues, then the violation action 127 might be to disallow all agents from the group from accessing the screen where the violation occurs by updating the action rules 134. These are merely examples of violation actions 127 and should not be considered limiting. In violation handling situations where the data being considered is audio and/or video data, a violation action may also be to manipulate the recorded/stored data such that the inappropriate data cannot be accessed through review of the recorded/stored data unless accessed by those with approval. For example, if the violation indicates that the credit card number is visible in the video data, one of the assigned violation actions may be to blur the account number or a portion of the account number in the stored video data. The same type of violation actions may be available for audio data as well.

CEC system 100 includes at least one supervisor desktop 125 which can be used by a CSR supervisor for reviewing human review notices 133 and determining violation actions 127 to implement based on the human review notice 133 and accompanying data. The CEC agent desktop 101 is connected to the CEC system which includes, in addition to the portions of the system described herein, for example the telephone system, text transmission systems, chat server system, messaging server system, a video system, an audio system. The supervisor desktop 125 can also be used for locating and modifying sensitive data 199 based on data type and/or based on customer. Therefore, if a company policy or a law changes governing the storage of certain types of sensitive data, the supervisor can query the DAE for the location of the storage all of a type of data. The supervisor can then implement action rules 134 governing the access to that type of data, remove all of that type of data, and/or simply understand where that data is stored. Further, if a customer calls wanting to know what sensitive information 199 the system has for that client or wants all sensitive information about them removed from the system, the supervisor can query the DAE for the location of all sensitive data for the specific customer. The supervisor can then implement action rules 134 governing the access to sensitive data for that customer, remove all sensitive data for that customer, or simply relay to the customer the sensitive data on file. It should be understood that the use of the term supervisor is really for distinction purposes and applies to any employee or person given authorization to access and manipulate said data.

It is further contemplated that the request for the location and manipulation of sensitive data 199 could be an automated process such that a customer may be able to send a request to the system asking that all sensitive data be reported to them and/or removed from the system. Given proper authentication, the system may automatedly complete the request.

It should be understood that while the above system 100 is described as a single integrated system each engine (data, audio, and video) could be a completely separate system and can be operated independent and separate from the other processing systems. All audio processing, video processing, and desktop processing can be completely separate and independent systems and methods. The VHS can be one VHS or there may be a different VHS for each system.

FIGS. 2A, 2B, 2C, 2D and 2E depict a flowchart of an exemplary embodiment of method 200 for automatedly continually monitoring the presence of sensitive data on a CSR's computer, terminal, etc., determining the appropriateness of the usages, access, input, and storing sensitive data, and automatedly determining corrective action(s) to be taken for inappropriate use, access, input, and storage of sensitive data.

At step 202 the Smart Monitoring System (SMS) starts monitoring an agent in the CEC system. The SMS is configured to continuously monitor CEC agents for the presence of sensitive information through the use of video monitoring, audio monitoring, and desktop monitoring. Through the monitoring, the SMS receives video data, audio data, and desktop data for each agent being monitored. Each type of data (video, audio, and desktop) includes associated metadata which includes at least a time stamp and an agent identification associated with the data.

The SMS receives continual audio data, video data, and desktop data for each agent. Desktop data may include, but is not limited to, a list of all applications/programs running on the agent desktop/terminal, a screen shot of each application/program running on the agent desktop/terminal, metadata relating to each application/program running on the agent desktop/terminal, ghost data (which includes keystrokes, text, images, etc. that have been entered into the agent's computer/terminal but not necessarily stored/saved into the system), and keystroke tracking data. Video data may include, but is not limited to, incoming and outgoing video data from the desktop camera and other potential cameras where the agent is in view. The video data may include a screen shot from the current state of the desktop video camera and a screen shot of the current state of any other cameras where the agent is in view. Video data can be run through Video analysis to generate a similar stream of text and images coupled with metadata. The audio data may include, but is not limited to, a recording of any conversations by the agent over the telephone or captured through a microphone in the agent's computer/terminal or any other microphone enabled to capture conversations by the agent. Audio data can be run through real-time speech analytics to generate a text stream coupled with audio metadata (which may include an indication of emotion, sentiment and intent).

At step 204, from the continuously received monitoring data (video, audio, and desktop), the SMS determines the current state of video data, audio data, and desktop data for the agent and the previous state of video data, audio data, and desktop data for the same agent.

At step 206, the SMS analyzes the current state monitoring data and metadata for the current state data (video, audio, and desktop) and the previous state monitoring data and metadata for the previous state data (video, audio, and desktop) to determine if any of the monitored data changed or was modified from the previous state to the current state.

What constitutes a change in data from one state to another could be dynamically determined based on a set of change state rules. These change state rules may be determined by the organization and customized for each organization, there may be a general set of agreed upon rules among a group of organizations. Further the rules could be manually updated/changed or automatedly changed based on training the system to create change state rules based on analysis of current state and previous state data. For example, regarding desktop monitoring, if the agent opened a new application in the current state that was not open in the previous state, a change has occurred in at least the desktop data or if the agent has entered text/key stroked into an application in the current state that was not in the previous state, a change has occurred in at least the desktop data. For example, regarding audio monitoring, If the agent or customer is talking in the current state audio data, it will be considered that the current state audio data has changed from the previous state audio data, regardless of whether the agent or customer was talking in the previous state. If the agent or customer is no longer talking (there is no audio data for the current state) in the current state audio data, but was talking in the previous state audio data, the current state audio data has changed from the previous state audio data. If there was no audio data for both the current state audio data and the previous state audio data, there would be no change in the audio data. With regards to video monitoring, if the agent has moved positions, has picked up the phone, there is a new customer in the video, these may all be examples of where the video data has changed. It should be understood that the above are merely examples change state rules and should not be considered limiting.

At step 208, the SMS optionally stores the monitored data, including the current state monitored data and associated metadata and the previous state monitored data and associated metadata in SMS storage. Because the SMS continuously monitors the video, audio, and desktop data for each agent, the storage can occur based on any number of factors. The storage can be based on specified time intervals, such as storing the current state of the video, audio, and desktop data every second, every minute, ever nano-second, etc. The storage could also occur based on different events such as there being a change in the data or when a specific application on the desktop is accessed or when an audio trigger occurs, etc. Further, it should be understood that the saving of video, audio, and desktop data can occur simultaneously such that if video data is being saved, the corresponding audio and desktop data is being saved as well. In another embodiment, the saving of video data, audio data, and desktop data could be independent of each other. Additionally, the saving could be a combination of simultaneous saving and independent saving based on rules determined for when saving should occur. The rules for saving can be predetermined rules such that when certain conditions are met the current state and/or previous state of video data, audio data, and/or desktop data should be saved. For example, one such rule might be that the current state of video, audio, and desktop data is saved very second. Another example rule may be that if there is any change in the current state of the audio data, the video data, and/or the desktop data, the changed data will be saved. Both of these example rules could be included in the predetermined rules and implemented at the same time. These are merely examples of rules for determining when the current state of the video data, audio data, and/or desktop data is saved.

If there is no change in the monitored data (video, audio, and/or desktop) determined at step 206, then after step 208, the SMS continues to monitor the agent and goes back to step 202. If the desktop/terminal are no longer in use, the process ends. If there is a change to audio data, video data, and/or desktop data, the SMS passes the information pertaining to the changed data to the appropriate analysis engine to determine if sensitive information is present.

If the desktop data has changed, at step 210, the SMS passes the current state desktop data and current state desktop metadata and optionally, previous state desktop data, and previous state desktop metadata to a Desktop Analysis Engine (DAE) and determines current screen data for each application/program running on the agent's desktop/terminal for the current desktop data. The DAE can determine if the agent desktop/terminal screen contains sensitive data or had sensitive data present that may have been copied, cut, pasted, or input in a different application/program, etc.

Through the use of keystroke monitoring, screen scraping, screen shots, etc. the system can determine current screen data for the current desktop data on an agent's desktop/terminal screen for each application/program in use (including metadata for each screen such as screen name), active time spent in each application/program window, text displayed and input into each application/program window, and actions the agent is performing. Not only can the DAE determine what data has been recently input into an application/program, it can determine what data is present on the screen (either information that is accessed or information that is automatically populated, information previously input into the application, etc.). It can also determine what copy, cut, and past actions have taken place since the last capture of desktop data, and what information may have been input and deleted since the previous state desktop data for each application/program. The DAE can determine this information for all applications/programs running on the system, not just the active application/program which may be viewed on the agent's desktop/terminal screen. The desktop data received by the DAE may include, but is not limited to, current desktop data and metadata and previous desktop data and metadata for each application/program running on the system, Desktop data (previous or current) includes, but is not limited to data that would be available from a screen shot of the application/program, data that has been input into an application, data that has been copied from the application, data that has been deleted from the application, data that has been cut from the screen, and data that has been pasted into the application. The desktop data (current or previous) is also associated with metadata which includes, but is not limited to the application/program in which the data is contained, a screen name and a list of fields for data in each screen for the application/program, a timestamp for the desktop data, the agent associated with the use/access of the desktop use.

At step 212, the DAE receives a sensitive screen list. The sensitive screen list contains a list of screen names from applications/programs that are known to contain sensitive information, potentially contain sensitive information, and/or have sensitive information input into the screen. For example, a screen in an application/program that when accessed presents a user's credit card information to the agent or a screen in an application/program that requests the agent to input credit card information for a user. The sensitive screen list received may be a list of all sensitive screens for all applications/programs. In another embodiment, it may be a list of all sensitive screens only for the applications/programs that are running in the current desktop data. In addition to the sensitive screen list, the DAE may receive sensitive screen data for each screen on the sensitive screen list. Sensitive screen data may include, but is not limited to, screen shots, field information, what type of information is contained in each field, what type of information is allowed to be input into each field where input is allowed, etc.

The sensitive screen list can be predetermined and/or automatedly determined and/or automatedly updated by the system. Typically, the initial sensitive screen list will be a predetermined list of screen names for applications/programs that are known to contain sensitive data or allow for the input of known sensitive data. The system is capable of automatedly determining that additional screens contain sensitive information and automatedly determining that the screen name should be added to the sensitive screen list. In some embodiments this may be a recommendation to a user, such as a business owner or IT professional to add the screen name to the sensitive screen list. However, in other embodiments, the system may automatedly add the screen name to the sensitive screen list based on the determination by the system that the screen should be added.

At step 214, the DAE analyzes the current screen data (and metadata) for each open application/program and determines if the current screen data for that application/program belongs to a screen on the sensitive screen list for that application/program. The analysis of the screen data can be accomplished in any number of ways to determine if the current desktop data from the applications/programs running on the desktop are for screens listed on the sensitive screen list. One way of determining if the current screen data for an application/program is on the sensitive screen list is to compare the name of the screen for the current screen data to the name of the screens on the received sensitive screen list. If the name of the screen for the current screen data matches the name on the received sensitive screen list, then that screen for the current screen data is a sensitive screen. However, this method is dependent on all screens for programs/applications being uniquely identifiable with no overlapping names. In another embodiment, the system can use screen scraping and desktop analytics to determine data relating to the applications/programs being used. Screen scraping can determine time spent on each application/window, text on screen and actions the user is performing. Screen scraping allows the system to compare more attributes of the current screen to the screens listed on the sensitive screen list and allows for a more detailed determination as to whether a current screen is on the sensitive screen list.

For each current screen determined to be on the sensitive screen list, at step 216, the DAE obtains action rules and screen maps relating to the current screen. The remaining steps 218-222 are performed for each current screen determined to be on the sensitive screen list.

The action rules are requirements for each screen on the sensitive screen list to be carried out for the current screen data as it relates to the access, input and manipulation of sensitive data for the screen. The action rules may be applicable to the screen as a whole or may be applicable only to certain fields for the screen. Further, the action rules may be applied to a group of types of screens, all screens for a particular program/application and may be applied to a particular group of agents, all agents, and even to individual agents. For example, if the current screen it is a sensitive screen that requires entering a customer's credit card information and storing it, the action rules may indicate that if the sensitive data (credit card information) has been entered, then the DAE is directed to store the sensitive data in a specified location and associate the sensitive data with other identifying information pertaining to the customer so the storage of the sensitive data can be easily tracked and located in the future. Another example of an action rule may be instructions pertaining to what information on a sensitive screen is viewable by the agent accessing the screen. Each agent may have different access levels to customer's sensitive information. If an agent who does not have access to view a customer's credit card information attempts to access a screen that contains that information, the action rules may instruct the system to block the agent's access to the screen or to black out the fields on the screen that contain information the agent does not have access to view. Another example of an action rule may be an inability to enter sensitive data into a field. For example, it may be determined that agents are intentionally and/or inadvertently entering sensitive data (credit card number, address, driver's license ID number, etc.) in the wrong filed of the screen. An action rule for that screen could instruct the DAE to determine if sensitive information has been entered into the identified wrong field. Essentially the action rules govern how sensitive information for the current screen is to be saved, accessed, entered, and manipulated for screens on the sensitive screen list.

Action rules may be determined by the user of the system and/or may be automatedly determined by the system based on the system's ability to learn and analyze use, input, access, and manipulation of sensitive data. In one embodiment, initially a system administrator or other user may determine action rules. Over time system may learn determine additional action rules or modify action rules. Through this learning, the system may recommend action rules/changes to actions rules or may automatedly create new actions rules/change current action rules.

Each screen on the sensitive screen list includes a screen map. Each screen map includes a listing of all fields in a particular screen, indications of which fields are allowed to contain sensitive data, the type of data allowed to be entered in a field, and how that data is allowed to be manipulated/accessed. The screen map may be based on metadata associated with each field of the screen. Further, the screen map may be modified/updated by the action rules which may override and/or change the metadata associated with the screen and/or field of the screen.

At step 218 for each of the current screens on the sensitive screen list, the applicable action rules for each current screen are executed based on the current screen data and agent accessing the screen. It should be understood that the execution of the action rules is a continuous operation that occurs instantaneously, or nearly instantaneously, with the access/modification of the screen by the agent. For example, if an action rule indicates a specific filed in a screen should be blacked out for a particular agent, when that agent accesses that screen the blacked-out field is immediately seen by the agent. There is no ability of the agent to first see the data in the blacked-out field and then the rules are executed, and the field is blacked out.

At step 220, for each current screen on the sensitive screen list, the DAE analyzes the current screen data and creates current field data for each field in the current screen. Field data may include, but is not limited to, a determination of what type of data, if any, is contained in the field. The analysis also includes pattern matching techniques to determine if the data in the field is sensitive data, whether copy/cut actions have been conducted on field data and if data has been input into the field and subsequently deleted. This information is included in the field data for each field in the current screen.

At step 222, for each current screen on the sensitive screen list, the DAE compares the created field data to the screen map to determine if sensitive data has been entered into a field of the current screen and if the sensitive data has been entered into inappropriate fields. This determination includes, but is not limited to, if sensitive data is entered the wrong field or if an improper copy/cut action has been performed on sensitive data contained in an appropriate filed.

Optionally, the DAE stores the current screen data, current field data, and results of the field data analysis to a DAE storage.

If the field data analysis determines that sensitive data is nonconforming (has been input in the wrong place or an inappropriate copy/cut/paste action has occurred, etc.), at step 224, the DAE sends a violation notice to a Violation Handler System (VHS) and passes all of the data, analysis, determinations, and information used to determine the violation to the VHS, which may include, but is not limited to, the current screen data, current field data, and field data analysis results.

If the analysis determines that sensitive data is not in the wrong place and has not been improperly copied, the DAE finishes and the process returns to step 202 to continue monitoring.

If, at step 214, least one current screen is determined to not be on the sensitive screen list, at step 226, the DAE receives sensitive data patterns. The sensitive data patterns are model text patterns that have been determined to likely match sensitive data that may be input and/or accessed in the system. The sensitive data patterns may be predetermined models and can be different for each organization/system to accommodate differences in systems and sensitive data stored in the system. For example, a sensitive data pattern for a particular brand of credit card may be 4XXXXXXXXXXXXXXX. A sensitive data pattern for a social security number may be XXX-XX-XXXX. It should be understood that these are merely simple examples of possible sensitive data patterns. It should be further understood that the sensitive data patterns can be as complex as required by the sensitive data that may be input and accessed within the system. Further, the system can be trained to recognize and determine sensitive data patterns automatedly through the labeling of fields and screens known or expected to contain sensitive data. The training can be ongoing each time a new screen is added to the sensitive screen list and each time a new filed is indicated to contain sensitive data. Accordingly, the sensitive data patterns can be dynamically updated based on the training. Further, the sensitive data patterns can be manually updated by a system user such as a manager or IT professional.

At step 228, for each current screen not on the sensitive screen list, the DAE analyzes the current screen data based on the sensitive data patterns to determine if any of the data in the fields of the current screen match the sensitive data patterns and are likely to contain sensitive data. It should be understood that the following steps of 230-236 can be performed by the DAE for each current screen not on the sensitive screen list either simultaneously/near simultaneously or consecutively.

If, at step 228, it is determined that any of the fields of the current screen are likely to contain sensitive data, at step 230, the DAE receives sensitive data use rules for the screen. The sensitive data use rules control and determine the allowed and disallowed use of sensitive data in screens and fields that have not been already determined to likely contain sensitive data (unlike screens on the sensitive screen list or fields that have been identified as likely to contain sensitive data). The sensitive data use rules may be predetermined rules. These rules can be field specific, application/program specific, and/or agent specific. The sensitive data use rules may also direct or indicate that certain use of sensitive data in a screen and/or field should cause the screen to be added to the sensitive screen list. For example, a sensitive data use rule may indicate that all agents in the payment section are allowed to input sensitive data patterns for credit cards in any field (even if it is not a field or screen that has been already indicated to contain sensitive data). However, another sensitive data use rule may indicate that no agents, including agents in the payment section, are allowed to perform a copy/cut action on any field that contains data that matches a sensitive data pattern for credit cards. Another example of a sensitive data use rule may be that no sensitive data (so any data that matches a sensitive data pattern) is allowed to be contained in any field in a particular application (for example perhaps no sensitive data is allowed to be accessed, input, presented, or modified in any email program). It should be understood that the above are merely examples of possible sensitive data use rules and should not be considered limiting.

At step 232, for each field of the current screen determined to likely contain sensitive data, the DAE analyzes the determined filed of the current screen based on the sensitive data use rules to determine whether the use of the sensitive data in the determined field is allowed or is inappropriate.

At step 234, the DAE determines whether the current screen is added to the sensitive screen list. If so, the DAE updates the sensitive screen list to include the current screen and creates a screen map for the current screen. The determination is made based on a number of factors which may include, but not limited to, the sensitive data use rules, the determined field, the matching sensitive data pattern(s), the data in the field, and agent information. In one embodiment, the determination may be also based on similarities between the current screen and/or the current field and other screens and/or fields determined to be on the sensitive screen list. In this embodiment, the system can take historical data to learn which screens that contain unexpected or at least not previously documented use of sensitive data should be included in the sensitive screen list.

If the analysis at step 232 determines that the use of the sensitive data is appropriate (or at least not inappropriate), the DAE process ends. And the SMS continues to monitor at step 202. It should be understood that the monitoring starting at step 202 is continuous and occurs simultaneously with the steps that follow.

Optionally, the DAE may pass the current screen data, the sensitive data use rules, and the current screen metadata to a supervisor, an agent, or other user for human review to determine if the use is actually appropriate and take any additional steps that the human review determines is necessary. Optionally, the DAE may also store the current screen data, note the field data that was determined to contain sensitive data, note the sensitive data pattern(s) that was determined to match the field data, note the sensitive data rule(s) that were used to determine whether the use of the data in the current field was appropriate (or not), and store all data that was used in determining whether the screen it added to the sensitive screen list. This stored information can be analyzed by the system as historic data and used to train the system to learn and create/update sensitive data use rules, sensitive data patterns, and the sensitive screen list. Further, the determinations made through the human review can also be stored in the system to contribute to the teaching data for the system.

If the analysis at step 232 determines that the use of data in the current filed is inappropriate/improper/not allowed, at step 236 the DAE sends a violation notice to the VHS and passes all of the data, analysis, determinations, and information used to determine the violation to the VHS, which may include, but is not limited to, the current screen data, the current field data, and data use rules analysis. The data use rules analysis includes, but is not limited to, what data use rules the DAE used to determine that the data in the current field is an inappropriate use.

If at step 208, the video data has changed, at step 238, the SMS passes the current video data to a Video Analysis Engine (VAE) to determine if the video contains sensitive data objects.

At step 240, using video analytics and image recognition, the VAE analyzes the current state video data to identify and classify objects in the video.

At step 242, the VAE compares all objects to a list of sensitive objects to determine if any of the objects in the current video data are a sensitive data object. The sensitive objects list contains the identification of objects that have been determined to indicate the possible improper use of sensitive information. Sensitive objects can be predetermined for each system and/or organization based on what has been determined to be indicative of sensitive data being improperly used. Potential examples of sensitive objects may be, but are not limited to, an agent's personal cell phone, a pen, a notepad, a credit card, etc. For example, in a CEC where the agent handles customer calls and emails through the CEC system, if the agent takes out their personal cell phone, it may be an indication that the agent is improperly attempting to copy or take a picture of sensitive data appearing on the agent's desktop/terminal. Another example may be if the agent is capable of performing all actions through the use of the agent's computer, if the agent were to take out a pen and/or notebook it may be an indication that the agent is improperly attempting to write down sensitive data they have input or accessed through the system. Another example may be if the agent is a CSR where customers interact with the agent in person and the agent holds up the customer's credit card to the video screen or a camera. This could be an indication that the agent is improperly attempting to capture an image of the customer's credit card information. It should be understood that these are merely examples of sensitive objects and situations where sensitive objects may appear in a CEC and should not be considered limiting.

At step 244, if any of the identified objects in the current video data match any of the objects on the sensitive object list, the VAE sends a violation notice to the VHS and passes all of the data, analysis, determinations, and information used to determine the violation to the VHS, which may include, but is not limited to, the current video data and the results of the comparison, which includes, but is not limited to an indication of which objects in the current video data were determined to be sensitive data objects and which objects on the sensitive data object list match those objects.

Optionally, if there are objects in the current video data that the VAE is not able to identify/classify, at step 246 the VAE passes the current video data and an indication of which objects are unidentified to a human review for identification and classification of the unidentified objects.

If no objects in the current video data are determined to be sensitive objects, the VAE process ends. And the SMS continues to monitor at step 202. It should be understood that the monitoring starting at step 202 is continuous and occurs simultaneously with the steps that follow.

If at step 208, the audio data has changed, at step 248, the SMS passes the current audio data to an Audio Analysis Engine (AAE) to determine if the audio contains sensitive data, sensitive data phrases, and/or stress/emotion indicators outside of normal parameters.

At step 250, the AAE analyzes the current audio data to convert the audio data to text and to create sentiment metadata for the current audio data. The sentiment metadata indicates the emotion and/or stress level for the current audio data.

Optionally, at step 252, the AAE stores the current audio data, the created textual transcript, and the created sentiment metadata to an AAE storage or some other storage location.

At step 254, the AAE analyzes the audio data text to determine if it contains any sensitive data or any phrases contained in a sensitive phrases list. The sensitive data/sensitive phrase list contains models of words, utterances, and phrases that are considered to include sensitive data or be requesting sensitive data. Sensitive data/sensitive phrases can be predetermined for each system and/or organization based on what has been determined to be indicative of sensitive data being improperly used/requested. Potential examples of sensitive objects may be, but are not limited to, reciting a customer's credit card number, requesting that a customer email their credit card, asking a customer's age, etc. Depending on the organization/industry what may be appropriate and inappropriate requests for sensitive data may vary greatly. It should be understood that these are merely examples of sensitive data/sensitive phrases and should not be considered limiting. It should be understood that the sensitive data/sensitive phrases list contains rules that indicate when the use of the sensitive phrase/sensitive data in audio text is inappropriate. These rules can be applied based on a number of criteria to apply to individual agents, groups of agents, all agents, etc.

At step 255, if the text of the current audio data is determined to contain any of the sensitive data or phrases contained on the sensitive phrase list, the AAE analyzes the sensitive data and the current sate audio data based on audio sensitive data use rules to determine if the sensitive data has been used improperly.

At step 256, if the above analysis indicates the sensitive data has been used improperly, the AAE sends a violation notice to the VHS and passes all of the data, analysis, determinations, and information used to determine the violation to the VHS, which may include, but is not limited to, the current audio data, the textual transcript created at step 250, the sentiment metadata created at step 250, and the results of the comparison, which includes, but is not limited to an indication of which portions of the transcribed audio text were identified as containing sensitive data/sensitive phrase and which sensitive phrases on the sensitive phrase list matched the identified text.

At step 258, the sentiment metadata is compared to a set of normal parameters for sentiment.

At step 260, if the sentiment metadata is outside of the normal parameters, the AAE sends a violation notice to the VHS and passes all of the data, analysis, determinations, and information used to determine the violation to the VHS, which may include, but is not limited to, the current audio data, the textual transcript created at step 250, the sentiment metadata created at step 250. The normal parameters are predetermined sentiment parameters that indicate what sentiment metadata are considered to be acceptable and do not require violation handling.

If the AAE does not pass the current audio data to the VHS, the AAE process ends for the current audio data. And the SMS continues to monitor at step 202. It should be understood that the monitoring starting at step 202 is continuous and occurs simultaneously with the steps that follow.

If at any of steps 224, 236, 244, 256, or 260, a violation notice is sent to the VHS, at step 262, the VHS receives the violation notice and accompanying data from the DAE, VAE and AAE. Each violation notice received by the VHS is processed by the VHS independently. It should be understood that the VHS is capable of processing violation notices simultaneously, consecutively, or in any other order prescribed by the system.

At step 264, the VHS receives violation actions. The violation actions are options that the system may choose to implement due to the violation notice received by the VHS. These actions may be implemented against the agent that the violation notice was associated with, against all agents, may be applied to certain screens, certain fields in certain screens, all screens, certain programs/applications, all applications/programs, etc. The violation actions are predetermined actions that can be updated manually. Some examples of violation actions may be, but are not limited to, notifying the agent that a violation has occurred, notifying the agent's supervisor that a violation has occurred, blocking and/or restricting the agent's access to field data, screen data, and/or program/application data, restricting the agent's actions in the application/program (for example blocking copy/cut/paste actions, or blocking the agent's ability to type in a notepad application when another specific application is open), flagging the agent and/or group of agents for training, flagging the agent and/or group of agents for additional supervision (for example monitoring agent using audio/video technology), conducting an audit of the agent's desktop usage over time, and automatically locking the agent out of the system or out of the program/application (for example automatedly blocking the agent's use of email). It should be understood that the above are merely examples of violation actions and the violation actions can be customized to fit each organization's needs.

At step 266, the VHS analyzes the violation notice and accompanying data based on violation determination rules to determine what violation actions should be taken for the violation. In addition to analyzing the violation notice and accompanying data, the VHS may also request the current video data, the current audio data, and/or the current desktop data that corresponds to the current data being analyzed with the violation notice. This additional data may aid in the analysis and determination of what violation action(s), if any, should be implemented for the determined inappropriate use, access, modification, and/or input of sensitive data.

At step 268, the VHS automatedly executes the violations actions for the violation notice based on the analysis at step 264. Optionally, the VHS stores the violation notice, accompanying data, additionally accessed data, and the violation action(s) implemented to VHS storage or other available storage. After step 266, the VHS process ends for the violation notice. And the SMS continues to monitor at step 202. It should be understood that the monitoring starting at step 202 is continuous and occurs simultaneously with the steps that follow. It should also be understood that the DAE, VAE, AAE, and VHS processes may occur simultaneously and as needed based on determinations made by the SMS, DAE, VAE, and AAE.

At step 270, a supervisor receives any human review notice and accompanying data, reviews and determines how the violation is to be handled. It should be understood that steps 266 and 268 could occur in any order and could occur simultaneously or near simultaneously. The human review notice may be sent to a violation review list prior to the supervisor receiving it.

FIG. 3 depicts an exemplary embodiment of a system 300 for determining and displaying sentiment in real-time or near real-time to agents for tracking the use, access, storage, and modification of sensitive information, determining if the use, access, storage, and modification is appropriate, and implementing violation actions for inappropriate use, access, storage, and modification of sensitive data.

System 300 is a computing system that includes a processing system 306, a storage system 304, software 302, a monitoring interface 308, and a user interface 310. Processing system 306 loads and executes software 302 from the storage system 304, including at least one software component 320. When executed by computing system 300, software component 320 directs the processing system 306 to operate as described herein in further detail in accordance with the method 200 and system 100. Computing system 300 is a specialized system specifically designed to perform the steps and actions necessary to execute method 200 and system 100. While some of the component options for computing system 300 may include components prevalent in other computing systems, computing system 300 is a specialized computing system capable of performing the steps and processes described herein.

Computing system 300 includes five software components 320 for performing the functions of SMS software component 111, DAE software component 141, VAE software component 171, and AAE software component 191, and VHS software component 161. Although computing system 300 as depicted in FIG. 3 includes five software components 320 in the present example, it should be understood that one or more components could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include central processing units, application specific processors, and logic devices, as well as any other type of processing device, combinations of processing devices, or variations thereof. While there are a number of processing devices available to comprise the processing system 306, the processing devices used for the processing system 306 are particular to this system and must specifically be capable of performing the processing necessary to execute method 200 and support system 100.

The storage system 304 can comprise any storage media readable by processing system 306, and capable of storing software 302 that is able to meet the needs of the specific computing system 300 and execute the storage required for method 200 and system 100. The storage system 304 may include volatile and non-volatile, removable and non-removable media implemented in any method or technology for storage of information, such as computer readable instructions, data structures, program modules, or other data. Storage system 304 may be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300. While many types of storage media may be incorporated into system 300, the storage media used must be specialized to the purpose of executing the storage requirements of method 200 and system 100 as described herein.

User interface 310 can include one or more CEC desktops, a supervisor desktop 125, an agent desktop 101, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display violation actions 127 and associated data/information, violation notices 131 and associated data/information, human review notices 133 and associated data/information or data/information accessed by users of the system associated with embodiments of the system and method as disclosed herein. Speakers, printers, haptic devices and other types of output devices may also be included in the user interface 310. A CSR, supervisor, agent, or other staff can communicate with computing system 300 through the user interface 310 in order to view violation actions 127 and associated data/information, violation notices 131 and associated data/information, human review notices 133 and associated data/information or data/information, and to input/update change state rules 114, predetermined saving rules 116, sensitive screen list 132, action rules 134, screen maps 136, sensitive object rules 144, sensitive data patterns 154, sensitive data use rules 156, sensitive object list 180, sensitive data and phrases list 121, normal sentiment parameters 132, violation actions 127, or any number of other tasks the CSR, supervisor, agent, or other staff may want to complete with computing system 300.

As described in further detail herein, computing system 300 receives and transmits data through monitoring interface 308. In embodiments, the monitoring interface 308 operates to send and/or receive data, such as, but not limited to, audio data with accompanying audio metadata 102, video data with accompanying video metadata 104, desktop data with accompanying desktop metadata 106, change state rules 114, predetermined saving rules 116, sensitive screen list 132, action rules 134, screen maps 136, sensitive object rules 144, sensitive data patterns 154, sensitive data use rules 156, sensitive object list 180, sensitive data and phrases list 121, normal sentiment parameters 132, violation actions 127 to/from other devices and/or systems to which computing system 300 is communicatively connected, and to receive and process conversations as described in greater detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An automated computer system for processing desktop data to automatedly apply violation handling for inappropriate use of sensitive data, the system comprising:
   at least one customer service representative (CSR) desktop device;
   at least one system processor, the system processor includes a smart monitoring system (SMS), a desktop analytics engine (DAE), and a violation handling system (VHS); and
   a non-transitory computer readable medium programmed with computer readable code that upon execution by the processor causes the processor to:
      instruct the SMS to analyze desktop data from the at least one CSR desktop device in real time to generate current state data and previous state data for each CSR desktop data,
      instruct the DAE to analyze the current state desktop data to identify active screens, wherein at least one active screen is a screen known to contain sensitive data and at least one active screen is a screen unknown to contain sensitive data, for each identified screen identify improper sensitive desktop data in the current state desktop data and generate desktop violation notices for each identified improper sensitive desktop data in the current state desktop data, and
      instruct the VHS to analyze desktop violation notices in real time to apply at least one violation action to each desktop violation notice.

2. The system of claim 1, wherein the SMS is further instructed to:
   receive desktop data from the at least one CSR desktop device in real-time;
   analyze the desktop data to create the current state for each desktop data based on identifying a change state for each desktop data based on the previous state for each desktop data; and
   transfer the current state and change state desktop data to the DAE.

3. The system of claim 1, wherein the DAE is further instructed to:
   perform screen scraping of the current state desktop data to determine a set of current screen data for the current state desktop data;
   compare the set of current screen data to a screen list to determine if any of the set of current screen data matches any screens on the screen list;
   based on the comparison, determine that at least one screen in the set of current screen data matches a screen on the screen list, wherein the at least one screen is a screen known to contain sensitive data; and based on the comparison, determine that at least one screen in the set of current screen data does not match any screen on the screen list, wherein the at least one screen is a screen unknown to contain sensitive data.

4. The system of claim 3, wherein the DAE is further instructed for each screen in the set of current screen data that match a screen on the screen list (match screens), perform the following:

implement a set of action rules for each match screen in real time;

use screen scraping on each match screen to generate a set of field data; and apply a field map model to the set of field data to identify nonconforming filed data;

identify at least one nonconforming field data out of all match screens and generate a desktop nonconforming violation notice for each nonconforming filed data; and transfer each desktop nonconforming violation notice to the VHS.

5. The system of claim 3, wherein the DAE is further instructed for all screens in the set of current screen data that do not match a screen on the screen list (nonmatch screens), perform the following:

apply a set of sensitive data patterns to the nonmatch screen screen data to determine if sensitive data is present in the nonmatch screen screen data;

identify at least one sensitive data in the nonmatch screen screen data;

analyze the at least one sensitive data in the nonmatch screen screen data based on sensitive data use rules to identify improper sensitive data use; and analyze the sensitive screen list and the screen maps based on the sensitive data in the nonmatch screen screen data and automatedly updating the sensitive screen list and the screen maps based on the analysis, identify at least one improper sensitive data use out of all nonmatch screens and generate a desktop use violation notice for each improper sensitive data use; and transfer each desktop use violation notice to the VHS.

6. The system of claim 1, the system further comprising:

at least one video recording device;

the at least one system processor further including a video analysis engine (VAE);

The non-transitory computer readable medium programmed with computer readable code that upon execution by the processor further causes the processor to:

instruct the SMS to analyze video data from the at least one video recording device in real time to generate current state data and previous state data for each video data, instruct the VAE to analyze the current state video data to identify improper sensitive objects in the current state video data and generate video violation notices for each identified improper sensitive object in the current state video data, instruct the VHS to analyze video violation notices in real time to apply at least one violation action to each video violation notice, and further instruct the VAE to:

analyze the current state video data to identify and classify objects in the current state video data;

analyze each object in the video data classified as a sensitive object to determine improper sensitive objects in the current state video data based on current state and previous state video data, for each improper sensitive object, generate a video violation notice, and transfer the video violation notice to the VHS.

7. The system of claim 6, the system further comprising:

at least one audio recording device;

the at least one system processor also including an audio analytics engine (AAE); and the non-transitory computer readable medium programmed with computer readable code that upon execution by the processor further causes the processor to:

instruct the SMS to analyze audio data from the at least one audio recording device in real time to generate current state data and previous state data for each audio data, instruct the AAE to analyze the current state audio data to identify improper sensitive audio data in the current state audio data and generate audio violation notices for each identified improper sensitive audio data in the current state audio data, instruct the VHS to analyze audio violation notices in real time to apply at least one violation action to each audio violation notice, and wherein the AAE is further instructed to:

generate audio metadata based on a textual transcript of the current state audio data;

analyze the textual transcript and audio metadata to identify sensitive data and an intent of current state audio data using audio analytics;

identify improper sensitive audio data in the current state audio data based on an analysis of each identified sensitive data and the current state audio data;

analyze the intent of the current state audio data to determine if the intent is within a set of normal parameters;

for each improper sensitive audio data, generate an audio violation notice;

for each intent outside the set of normal parameters, generate an audio violation notice; and transfer each audio violation notice to the VHS.

8. The system of claim 7, wherein the VAE is further instructed to:

receive all audio violation notices, video violation notices, desktop violation notices in real time;

for each audio violation notice, video violation notice, desktop nonconforming violation notice, and desktop use violation notice (violation notices), analyze the violation notice against a set of violation determination rules to apply at least one violation action;

apply the at least one violation action to implement a proscribed action to at least one of the video recorder, audio recorder, or desktop associated with the violation notice; and analyze the violation determination rules, the violation actions, and the violation notices to automatedly update the violation determination rules and the violation actions.

9. A method for processing desktop data to automatedly apply violation handling for inappropriate use of sensitive data, the method comprising:

analyzing, by a smart monitoring system (SMS), desktop data in real time to generate current state data and previous state data for each desktop data;

analyzing, by a desktop analytics engine (DAE), the current state desktop data to identify active screens, wherein at least one active screen is a screen known to contain sensitive data and at least one active screen is a screen unknown to contain sensitive data, for each identified screen identify improper sensitive desktop data in the current state desktop data and generate desktop violation notices for each identified improper sensitive desktop data in the current state desktop data; and analyzing, by a violation handling system (VHS), desktop violation notices in real time to apply at least one violation action to each desktop violation notice.

10. The method of claim 9, the method further comprising the SMS performing the following:

receiving desktop data from at least one CSR desktop device in real-time;

analyzing the desktop data to create the current state for each desktop data based on identifying a change state for each desktop data using on the previous state for each desktop data; and transferring the current state and change state desktop data to the DAE.

11. The method of claim 9, the method further comprising the DAE performing the following:

receiving the current state desktop data from the SMS in real-time;

performing screen scraping of the current state desktop data to determine a set of current screen data for the current state desktop data;

comparing the set of current screen data to a screen list to determine if any of the set of current screen data matches any screens on the screen list;

based on the comparison, determining that at least one screen in the set of current screen data matches a screen on the screen list, wherein the at least one screen is a screen known to contain sensitive data; and based on the comparison, determining that at least one screen in the set of current screen data does not match any screen on the screen list, wherein the at least one screen is a screen unknown to contain sensitive data.

12. The method of claim 11, the method further comprising the DAE performing the following for each screen in the set of current screen data that match a screen on the screen list (match screens):

implementing a set of action rules for each match screen in real time;

using screen scraping on each match screen to generate a set of field data; and applying a field map model to the set of field data to identify nonconforming filed data;

identifying at least one nonconforming field data out of all match screens and generating a desktop nonconforming violation notice for each nonconforming filed data; and transferring each desktop nonconforming violation notice to the VHS.

13. The method of claim 11, the method further comprising the DAE performing the following for all screens in the set of current screen data that do not match a screen on the screen list (nonmatch screens):

applying a set of sensitive data patterns to the nonmatch screen screen data to determine if sensitive data is present in the nonmatch screen screen data;

identifying at least one sensitive data in the nonmatch screen screen data;

analyzing the at least one sensitive data in the nonmatch screen screen data based on sensitive data use rules to identify improper sensitive data use; and analyzing the sensitive screen list and the screen maps based on the sensitive data in the nonmatch screen screen data and automatedly updating the sensitive screen list and the screen maps based on the analysis, identifying at least one improper sensitive data use out of all nonmatch screens and generating a desktop use violation notice for each improper sensitive data use; and transferring each desktop use violation notice to the VHS.

14. The method of claim 9, the method further comprising:

analyzing, by the SMS, video data from at least one video recording device in real time to generate current state data and previous state data for each video data, instructing a video analysis engine (VAE) performing the following:

analyzing the current state video data to identify improper sensitive objects in the current state video data and generate video violation notices for each identified improper sensitive object in the current state video data;

analyzing video violation notices in real time to apply at least one violation action to each video violation notice;

analyzing the current state video data to identify and classify objects in the current state video data;

analyzing each object in the video data classified as a sensitive object to determine improper sensitive objects in the current state video data based on current state and previous state video data;

for each improper sensitive object, generating a video violation notice; and transferring the video violation notice to the VHS.

15. The method of claim 14, the method further comprising instructing the SMS to analyze audio data from at least one audio recording device in real time to generate current state data and previous state data for each audio data, instructing an audio analysis engine (AAE) to analyze the current state audio data to identify improper sensitive audio data in the current state audio data and generate audio violation notices for each identified improper sensitive audio data in the current state audio data, instructing the VHS to analyze audio violation notices in real time to apply at least one violation action to each audio violation notice, wherein the AAE further performs the following:

receiving the current state audio data from the SMS in real-time;

generating audio metadata based on a textual transcript of the current state audio data;

analyzing the textual transcript and audio metadata to identify sensitive data and an intent of current state audio data using audio analytics;

identifying improper sensitive audio data in the current state audio data based on an analysis of each identified sensitive data and the current state audio data;

analyzing the intent of the current state audio data to determine if the intent is within a set of normal parameters;

for each improper sensitive audio data, generating an audio violation notice;

for each intent outside the set of normal parameters, generating an audio violation notice; and transferring each audio violation notice to the VHS.

16. The method of claim 15, the method further comprising the VHS performing the following:

receiving all audio violation notices, video violation notices, desktop violation notices in real time;

for each audio violation notice, video violation notice, desktop nonconforming violation notice, and desktop use violation notice (violation notices), analyzing the violation notice against a set of violation determination rules to apply at least one violation action;

applying the at least one violation action to implement a proscribed action to at least one of the video recorder, audio recorder, or desktop associated with the violation notice; and analyzing the violation determination rules, the violation actions, and the violation notices to automatedly update the violation determination rules and the violation actions.

17. A non-transitory computer readable medium programmed with computer readable code that upon execution by a processor causes the processor to execute a method for automatedly processing desktop data to automatedly apply violation handling for inappropriate use of sensitive data, the method comprising:

analyzing, by a smart monitoring system (SMS), desktop data in real time to generate current state data and previous state data for each desktop data;

analyzing, by a desktop analytics engine (DAE), the current state desktop data to identify active screens, wherein at least one active screen is a screen known to contain sensitive data and at least one active screen is a screen unknown to contain sensitive data, for each identified screen identify improper sensitive desktop data in the current state desktop data and generate desktop violation notices for each identified improper sensitive desktop data in the current state desktop data; and analyzing, by the VHS, desktop violation notices in real time to apply at least one violation action to each desktop violation notice.

18. The non-transitory computer readable medium of claim 17, wherein the processor is further instructed to cause the SMS to perform the following:

receiving desktop data from the at least one CSR desktop device in real-time;

analyzing the desktop data to create the current state for each desktop data based on identifying a change state for each desktop data based on the previous state for each desktop data; and transferring the current state and change state desktop data to the DAE.

19. The non-transitory computer readable medium of claim 18, wherein the processor is further instructed to cause the DAE to perform the following:

receiving the current state desktop data from the SMS in real-time;

performing screen scraping of the current state desktop data to determine a set of current screen data for the current state desktop data;

comparing the set of current screen data to a screen list to determine if any of the set of current screen data matches any screens on the screen list;

based on the comparison, determining that at least one screen in the set of current screen data matches a screen on the screen list, wherein the at least one screen is a screen known to contain sensitive data; and based on the comparison, determining that at least one screen in the set of current screen data does not match any screen on the screen list, wherein the at least one screen is a screen unknown to contain sensitive data;

for each screen in the set of current screen data that match a screen on the screen list (match screens):

implementing a set of action rules for each match screen in real time;

using screen scraping on each match screen to generate a set of field data; and applying a field map model to the set of field data to identify nonconforming filed data;

identifying at least one nonconforming field data out of all match screens and generating a desktop nonconforming violation notice for each nonconforming filed data; and transferring each desktop nonconforming violation notice to the VHS; and for all screens in the set of current screen data that do not match a screen on the screen list (nonmatch screens):

applying a set of sensitive data patterns to the nonmatch screen screen data to determine if sensitive data is present in the nonmatch screen screen data;

identifying at least one sensitive data in the nonmatch screen screen data;

analyzing the at least one sensitive data in the nonmatch screen screen data based on sensitive data use rules to identify improper sensitive data use; and analyzing the sensitive screen list and the screen maps based on the sensitive data in the nonmatch screen screen data and automatedly updating the sensitive screen list and the screen maps based on the analysis, identifying at least one improper sensitive data use out of all nonmatch screens and generating a desktop use violation notice for each improper sensitive data use; and transferring each desktop use violation notice to the VHS.

20. The non-transitory computer readable medium of claim 19, wherein the processor is further instructed to cause the VHS to perform the following:

receiving all desktop violation notices in real time;

for each desktop nonconforming violation notice, and desktop use violation notice (violation notices), analyzing the violation notice against a set of violation determination rules to apply at least one violation action;

applying the at least one violation action to implement a proscribed action to at least one desktop associated with the violation notice; and analyzing the violation determination rules, the violation actions, and the violation notices to automatedly update the violation determination rules and the violation actions.

* * * * *